United States Patent
Shue

(10) Patent No.: US 8,000,847 B2
(45) Date of Patent: Aug. 16, 2011

(54) CONTROL SYSTEM FOR AUTOMATIC FLIGHT IN WINDSHEAR CONDITIONS

(75) Inventor: Shyhpyng Jack Shue, Grapevine, TX (US)

(73) Assignee: Textron Innovations Inc., Providence, RI (US)

(*) Notice: Subject to any disclaimer, the term of this patent is extended or adjusted under 35 U.S.C. 154(b) by 380 days.

(21) Appl. No.: 11/663,906

(22) PCT Filed: Oct. 11, 2005

(86) PCT No.: PCT/US2005/036722
§ 371 (c)(1),
(2), (4) Date: Mar. 26, 2007

(87) PCT Pub. No.: WO2007/005045
PCT Pub. Date: Jan. 11, 2007

(65) Prior Publication Data
US 2008/0046137 A1    Feb. 21, 2008

(51) Int. Cl.
*G05D 1/06* (2006.01)
(52) U.S. Cl. .......... 701/10; 244/181; 244/183; 244/189; 244/194; 356/450; 356/28.5; 356/484; 340/968
(58) Field of Classification Search ............... 701/1, 10; 244/181, 183, 189, 194; 356/450, 28.5, 484
See application file for complete search history.

(56) References Cited

U.S. PATENT DOCUMENTS

| | | | |
|---|---|---|---|
| 4,797,674 A * | 1/1989 | Zweifel et al. | 340/968 |
| 4,947,164 A | 8/1990 | Bateman | |
| 4,965,573 A * | 10/1990 | Gallagher et al. | 340/968 |
| 5,175,551 A | 12/1992 | Rubin | |
| 5,216,477 A * | 6/1993 | Korb | 356/28.5 |
| 5,744,710 A * | 4/1998 | Abatzoglou et al. | 73/170.11 |
| 5,860,807 A * | 1/1999 | McFarland et al. | 434/33 |
| 6,460,810 B2 * | 10/2002 | James | 244/194 |
| 6,856,396 B2 * | 2/2005 | McGuire | 356/450 |
| 7,720,657 B1 * | 5/2010 | Gage | 703/8 |
| 2008/0046137 A1 * | 2/2008 | Shue | 701/10 |

OTHER PUBLICATIONS

CA Office Action, Sep. 4, 2009.

* cited by examiner

*Primary Examiner* — Mark Hellner
*Assistant Examiner* — Redhwan Mawari
(74) *Attorney, Agent, or Firm* — James E. Walton; Richard G. Eldredge

(57) ABSTRACT

A flight control system is configured for controlling the flight of an aircraft through windshear conditions. The system has means for measuring values of selected flight performance states of the aircraft and a control system for operating flight control devices on the aircraft. A windshear detection system located on the aircraft uses at least some of the measured values of the selected flight performance states to calculate a gust average during flight for comparison to pre-determined values in a table for determining whether windshear conditions exist. The control system then operates at least some of the flight control devices in response to an output of the windshear detection system.

9 Claims, 16 Drawing Sheets

CONTROL SYSTEM FOR AUTOMATIC FLIGHT IN WINDSHEAR CONDITIONS

TECHNICAL FIELD

The present invention relates generally to the field of flight control systems for aircraft and relates particularly to a system for automatic flight and recovery in microbursts.

DESCRIPTION OF THE PRIOR ART

An unmanned aerial vehicle (UAV) is defined as a powered, aerial vehicle that has does not carry a human operator, flies autonomously or is piloted remotely, and is expendable or recoverable. When control is exercised by a remote pilot, control may be continuous or episodic. However, autonomous vehicles may follow preprogrammed courses and may or may not have the capacity for rerouting or re-targeting.

UAVs are typically designed to be reusable, though UAVs have shorter expected life spans than manned aircraft due to higher attrition in operations, especially in combat. UAVs will survive for a relatively small number of sorties until failures, accidents, or hostile action destroys them. The loss rate for aircraft and UAVs is an important concept that influences the cost-effectiveness of UAVs and manned vehicles.

A principal reason for using UAVs is not only to reduce the risk to humans in combat or other hazardous missions, but also to perform missions in a more efficient and less costly fashion than has historically been the case with manned vehicles. Another related reason is that freeing machines from the limitations imposed by humans would allow an increase in their performance. From the beginning, the hope has been that unmanned air vehicles would be less expensive to develop and manufacture than that of manned aircraft, and that UAVs will reduce the demand for the supporting facilities and manpower that modern manned aircraft require.

As a result of technological advances in flight control, data and signal processing, off-board sensors, communications links, and integrated avionics, UAVs are now a serious option. To allow for autonomous operation, many types of systems are being developed for UAVs, including, for example, systems for friend-or-foe recognition or traffic avoidance. Flight control systems may be configured for controlling UAVs in particular types of flights, such as search-and-rescue operations, or for flight during inclement weather conditions.

In manned aircraft, a pilot is in control of the aircraft and will take corrective action when weather conditions deteriorate and cause a safety concern. For example, a pilot may see a thunderstorm ahead of the aircraft and steer the aircraft around the storm to avoid the undesirable effects of low-level windshear in the form of microbursts. However, a UAV operating autonomously will not know the storm is approaching and may fly directly into the storm.

The effects of microbursts on aircraft have been a subject of intensive investigation for the past several decades. Microbursts are characterized by a downward gust of wind that produces sudden changes in wind speed or its direction when it interacts with the ground. Microbursts are considered a serious hazard to flight safety, producing large adverse aerodynamic effect on aircraft performance, changing the aircraft flight path without warning, and impairing and thrust, momentum and lift of an aircraft. Since many aircraft accidents have been attributed to the effect of low-level windshear, design of control systems for aircraft encountering microbursts has become an important topic in flight control.

The adverse aerodynamic effects on the aircraft due to microbursts result from a sudden and substantial change in the vertical and horizontal wind speed. Microburst models have been developed using in-flight data, and most of these models employ the Dryden representation of wind gusts. These models are combined with the aircraft parameter identification method to develop the necessary control laws. One of main difficulties in designing the control laws has been the uncertainty in modeling of aerodynamic coefficients for microburst conditions and the ability to account for nonlinear effects.

When a UAV flies toward a microburst range, the controlling ground station may not detect this possible hazard. At the same time, the UAV may lose the communications link with the ground station and may not be able to receive other satellite or other wireless related signals, such as Global Positioning System (GPS) signals. How the UAV reacts to the conditions within the microburst will determine whether the UAV can survive under microburst attack, and it has been shown that standard flight control laws may not successfully direct the UAV to escape the microburst.

The problem of controlling the flight and recovery of a UAV under microburst conditions on the flight path is shown in FIG. 1. As shown in the figure, UAV 11 is programmed to fly along path 13. A microburst area 15 in storm 17 produces a central downburst 19, which is directed outward into lateral outbursts 21, 23 when downburst 19 contacts the ground below storm 17. As UAV 11 passes through outburst 21, it may have extra lift generated by the upward wind coming from the ground or by a head wind, and this condition will be referred to as Condition 1. UAV 11 in this condition is "ballooning," and the extra lift may cause the flight control system to reduce the flight control inputs due to this phenomenon. UAV 11 will then lose large amounts of lift when the direction and speed of winds change as UAV 11 flies into Condition 2, which is the central downburst 19.

When UAV 11 is in Condition 2, the downward rushing wind (which may have heavy rain entrained within) directly impacts the aircraft on the body, wings, and tail. UAV 11 will lose some lift due to this effect if the flight control system does not make any correction. From Condition 1 to Condition 2, the lift of UAV 11 is slightly increased in Condition 1 and suddenly decreases a large amount in Condition 2. This unexpected change will not be recognized by the system immediately, and this is one of the reasons that aircraft have greatly diminished performance during this transition.

As UAV 11 enters outburst 23, which forms Condition 3, the lift of UAV 11 is still decreasing. A tail wind causes the wings to lose lift, and the downward wind pushes UAV 11 toward the ground. In a helicopter or other rotary-wing aircraft, this kind of motion may impair the main rotor and flight control. If the control system does not make any correction in Condition 2, at Condition 3 it may be too late for the UAV 11 to recover from the microburst effect. Therefore, design of a robust control law to offset the effects of all three conditions may allow UAV 11 to survive a microburst event.

Typically, the tools used to provide the necessary information for aircraft in windshear prediction are a weather radar and an electronic flight instrument system (EFIS). The weather radar, air data computer (ADC), or other sensor works on an echo principle for weather detection and ground mapping. The radar/ADC sends out short bursts of electromagnetic energy that travel through space as a radio wave. When the traveling wave of energy strikes a target, some of the energy reflects back to the radar receiver, and electronic circuits measure the elapsed time between the transmission and the reception of the echo to determine the distance to the target (range). The EFIS system works with the flight management system to provide the necessary information for the flight control. This information may include wind speed and direction, altitude, pitch, pitch rate, angle of attack, or other parameters. Therefore, combination of the weather radar/ADC and EFIS system will provide the information needed by the aircraft.

SUMMARY OF THE INVENTION

There is a need for a flight control system that provides for automatic flight and recovery in windshear conditions.

Therefore, it is an object of the present invention to provide a flight control system that provides for automatic flight and recovery in windshear conditions.

A flight control system is configured for controlling the flight of an aircraft through windshear conditions. The system has means for measuring values of selected flight performance states of the aircraft and a control system for operating flight control devices on the aircraft. A windshear detection system located on the aircraft uses at least some of the measured values of the selected flight performance states to calculate a gust average during flight for comparison to predetermined values in a table for determining whether windshear conditions exist. The control system then operates at least some of the flight control devices in response to an output of the windshear detection system.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

Figure 1:
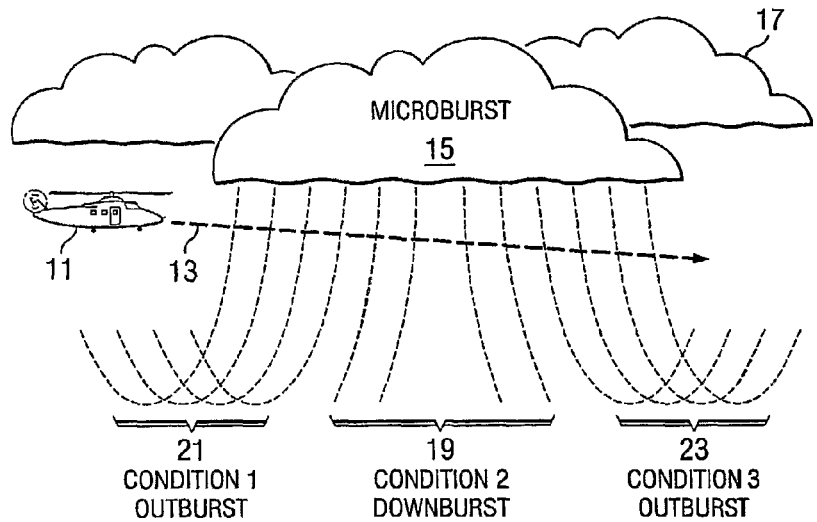
FIG. 1 is a side view of a microburst, the view showing the three sections of the microburst.

The present invention is directed to a flight control system configured for automatically controlling the flight of an aircraft in a microburst. The system decreases the possibility of losing UAVs under microburst attack and increases the survivability rate, making UAVs having the system of the invention a more cost-effective system.

In order to make the UAV detect microburst conditions and intelligently recover from this impact, intelligent state flow technology is used in the system of the invention. In recent years, there has been considerable progress in the control of uncertain systems using $H_\infty$ robust control techniques. The $H_\infty$ robust technique has been shown to be the best method to account for the uncertainty in microburst models and aerodynamic coefficients in control law design.

The system of the invention is directed to handling strong disturbances (such as a severe storm or so-called dry microbursts) and microbursts in a thunderstorm. The system provides for controlled flight within and from maximum microbursts using intelligent state flow technology. Automated mode selection from aircraft sensors will be combined with state flow technology as a system to make intelligent decisions, and robust control laws with a maximum weather gust spectrum and system uncertainties will be used to stabilize the aircraft encountering microbursts. Dangerous factors computed from an air data computer (ADC) or other sensors based on microburst factors will be introduced to determine the aircraft motion to escape from the condition.

Intelligent state flow gain scheduling controllers are employed to develop the necessary control laws for the aircraft to recover from a microburst. The robust method of avoiding the effect of the aircraft lift from microburst is employed to find the necessary conditions for the aircraft. The changes of lift of the aircraft from the three conditions described above for a microburst are presumed to be one of major effects that should be recovered in microburst.

It is known that the aircraft lift is generated by $$L = \hat{q} S C_L \qquad (1)$$
$$= \frac{1}{2} \rho U_0^2 S [C_{L_\alpha} \alpha + C_{L_q} q + C_{L_\theta} \theta +$$
$$C_{L_u} u + C_{L_{long}} \delta_{long} + C_{L_{coll}} \delta_{coll}].$$

In microburst, the lift of the aircraft is changed not only with respect to the maneuvers of the system, but also with respect to the related airspeed and air density. Therefore, the total lift of aircraft in the microburst contains large uncertain coefficient terms, and these coefficients are varying with respect to wind speed, wind direction, aerodynamics, angle of attack, etc. This is discussed below in greater detail.

Similarly, the pitch moment also plays a very important role in flight within a microburst. Therefore, this performance is employed to reduce the possible change of flight path during microburst effect. The pitch moment is shown to be of the following form:

$$M = \hat{q} S C_M \qquad (2)$$
$$= \frac{1}{2} \rho U_0^2 S \bar{c} [C_{M_\alpha} \alpha + C_{M_q} q + C_{M_\theta} \theta +$$
$$C_{M_u} u + C_{M_{long}} \delta_{long} + C_{M_{coll}} \delta_{coll}].$$

This equation also contains some uncertain factors when calculated for conditions within a microburst.

Acceleration of the aircraft for altitude control is one of the most important parameters to be stabilized. The normalized acceleration of an aircraft based on a distance from the center of gravity (CG) of an aircraft can be represented as $$\frac{a_{z_x}}{U_0} = \dot{\alpha} - q - \frac{l_x \dot{q}}{U_0} = \frac{\ddot{h}}{U_0} - \frac{l_x \dot{q}}{U_0}, \qquad (3)$$

where the parameter, $l_x$, is the distance between the CG of the aircraft and the sensor measuring the acceleration.

The above lift, moment, and acceleration equations are considered as the most important terms affected by microburst. The reason for selecting these three variables is to minimize the sensitivity of trajectory changes in the flight path under microburst. Therefore, these terms are employed as the performance outputs of the system used for the $H_\infty$ robust control technique.

In this invention, a group of linearized longitudinal models of aircraft are considered with respect to varying aerodynamic coefficients due to a microburst. As noted above, an aircraft is affected by microburst not only in its maneuvers but also in the related airspeed and the air density. In order to obtain the associated uncertain system, the equation for longitudinal and lateral motions of aircraft are used. The embodiment of the invention shown below is based on the equations of motion for helicopters, though other embodiments of the invention may alternatively be based on the equations for other types of aircraft. The equations for helicopters are represented as follows:

Lateral Equation of Motion:

$$\dot{X}_k^{lat} = A_k^{lat} X_k^{lat} + B_k^{lat} U^{lat}$$

$$Y_k^{lat} = C_k^{lat} X^{lat} \text{ where } k=0,1,\ldots j \qquad (4)$$

Longitudinal Equation of Motion:

$$\dot{X}^{long} = A_k^{longt} X^{long} + B_k^{long} U^{long}$$

$$Y^{long} = C_k^{long} X^{long} \text{ where } k=0,1,\ldots j \qquad (5)$$

where $X^{lat}$ is $(v, \phi, \psi, p, r)^T$, $X^{long}$ is $(u, w, \theta, q)^T$, $U^{lat}$ is $(\delta_{ped}, \delta_{lat})^T$, and $U^{long}$ is $(\delta_{long}, \delta_{coll})^T$. $A_k^{lat}$ and $A_k^{long}$ are 5×5 and 4×4 matrices, respectively, $B_k^{lat}$ and $B_k^{long}$ are 5×2 and 4×2 matrices, and $C_k^{lat}$ and $C_k^{long}$ are 5×10 and 4×11 matrices. Note that $k=0, 1, \ldots j$, are the number of models selected to compute the robust feedback control gain for the flight control system. The total numbers selected for the control law development are not limited and are dependent on system performance requirements. The above state space representation implies that all state variables are employed to provide $H_\infty$ robust feedback control laws. Because the system of the invention is primarily directed to a rotary-wing aircraft, the above equations of motions are chosen from the steady state value of aircraft speed between 60-100 kts with an altitude less than 1750 ft.

The reason for selecting these models is to find the system uncertainties for norm-bound criteria to be used to compute the robust feedback control gain. The differences between any two associated linear systems can be computed and determined from the above process. These differences between each model are considered as the uncertainties possible from parameter changes, or system nonlinearities or the system disturbances. These uncertainties can be very easily computed if the aerodynamic data are sufficient. Usually, these data are generated from computational fluid dynamics (CFD) systems and flight tests through parameter identification analysis. The norm-bound matrix criteria can then be determined from these uncertainties. These norm-bounded criteria can be employed to compute the robust control feedback gain to ensure the system satisfies the worst-case analysis on the above pre-determined flight conditions. Detail methodology of generating the required norm bounded matrix criteria satisfying the system uncertainties will be discussed below.

The methods applied to develop the necessary flight control laws for an aircraft to escape from a microburst can be classified into four categories. The first one is generated from the concept of intelligently detecting microburst attack. In order to avoid possible communicating confusion between ground station and the aircraft, several mode designs in the aircraft are introduced. Through mode logic design, the aircraft can automatically trigger the proper response.

The second category is related to the system uncertainties generated from a microburst event. A norm-bounded method to predict system uncertainty limits will be introduced, and robust control design will be applied to ensure all uncertainties generated from this norm-bounded matrix are fully covered in this control law. This will ensure that the aircraft has the capability to recover from a microburst when the worst-case condition is applied.

The third category is to design an emergency condition for the aircraft when the system detects failures in communications or a microburst is too strong to be successfully navigated.

The last category is to employ state flow technology to connect all the above portions together and to intelligently command the aircraft following pre-design flight paths for three microburst conditions.

Microburst Detection

Microburst detection is based on information from aircraft avionics devices and sensors. These sensor data can come from the flight control computer, air data computer (ADC), weather radar, GPS, ground station display, radar altimeter, and/or from other avionics. A flight control system 25 having a microburst automatic detection system 27 according to the invention and using these data is illustrated in FIG. 2.

Microburst automatic detection system 27 employs the concept of system identification method. Instead of estimating aircraft parameters, the process noise wavelength, covariance and spectrum are predicted. All aircraft parameters are pre-estimated and known as an input deck based on airspeed and altitude. Therefore, in the reverse system parameter ID method, the parameters to be estimated will be residuals. Through residual computation, the system's process covariance can be estimated, and using a Dryden spectral density function method, this estimated covariance from reversed parameter ID method can be employed to compute the wavelength and power spectral function at the aircraft's current condition. Either equation error estimation method or output error estimation method can be used to complete the covariance estimation through residuals. Online reversed parameter ID method and reversed Dryden power spectral density function are purely linear. With a time counter function, the noise level can be detected if gust velocities increase gradually. Therefore, gust wavelengths from three dimensions can be determined so that gust velocities can be computed. These gust velocity values are compared to standard disturbance values provided from weather data based on various altitude and airspeed. Therefore, the real-time microburst can be predicted and computed.

Figure 2:
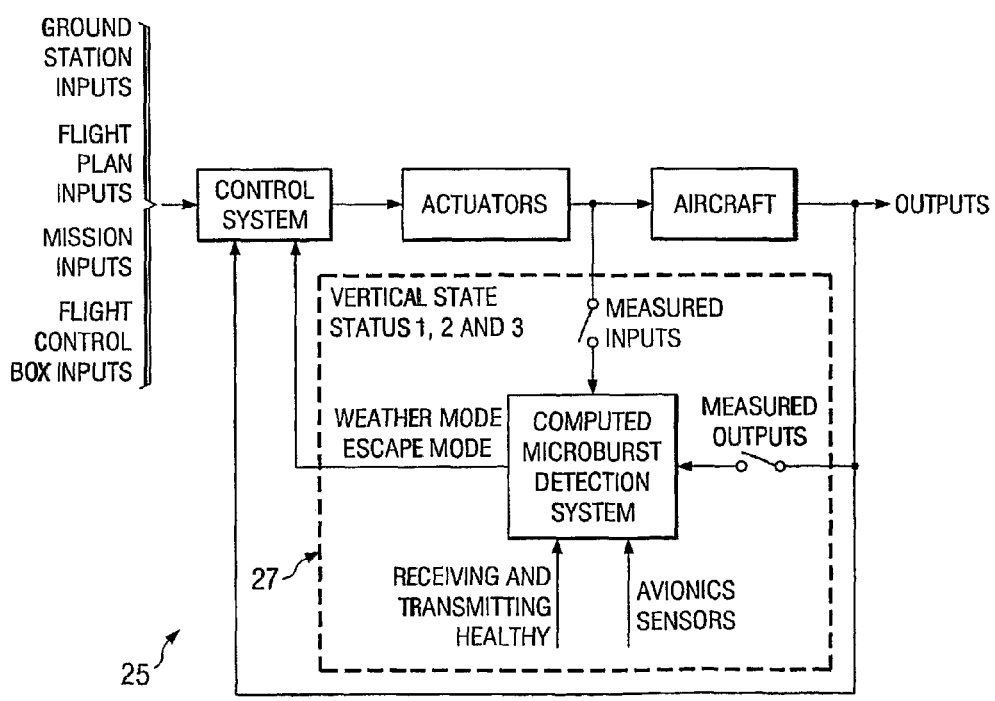
FIG. 2 is a schematic view of a flight control system according to the present invention.

In FIG. 2, the software logic of microburst automatic detection system 27 is shown within the dashed-line portion. It is known in the art that the wavelength, power spectral density function, and spatial frequency with respect to airspeed are coupled together. It has been shown that for an altitude less than 1750 ft, any unit direction of gust speed higher than 4 m/s is considered to be a severe storm. With this information, the weather mode of system 27 can be determined and is shown in Table I. While particular values are shown here, more strict values may be employed to determine the storm level, or the system may use a standard weather CAT system.

TABLE I

Example of gust profile definitions used in software

| Item | Description | Unit direction gust speed |
| --- | --- | --- |
| 1 | Clear Air | Less than 0.5 m/sec |
| 2 | Cumulus Cloud | Between 0.5-2.0 m/sec |
| 3 | Moderate Turbulence | Between 2.0-3.9 m/sec |
| 4 | Severe Storm | Between 3.9-6.9 m/sec |
| 5 | Thunderstorms | Higher than 7 m/sec |

With the values in the Table 1, reversed system parameter ID method, and reversed Dryden power spectral method, for any airspeed and any aircraft's altitude lower than 1750 feet, weather condition relationship with respect to the gust wavelength and bandwidth can be estimated by system 27. Also, based on measurement noise with respect to weather categories provided from weather station, the gust velocity ($u_g$, $v_g$, $w_g$) in three directions can be estimated and computed by system 27. System 27 preferably has thunderstorm mode that contains a table collected from various kinds of weather conditions related to microbursts and provided from the National Severe Storms Lab. A microburst mode can then be selected based on the computed gust level.

System 27 has software logic for triggering a weather mode and an escape mode. The gust values predicted from the logic trees within system 27 will compare the values from avionics sensors and control total input efforts to determine whether aircraft is in a microburst condition.

System Uncertainties from Microburst

Microburst gust velocities, ($u_g$, $v_g$, $w_g$), estimated from the method provided above can be considered to be linearly related gradients with respect to aircraft equation of motions. Using the following small perturbations for longitudinal and lateral motions, these gust velocities can be represented as:

$$\begin{cases} u = u + u_g \\ w = w + w_g \\ q = q + q_g \end{cases} \text{for longitudinal gust terms} \quad (6)$$

$$\begin{cases} v = v + v_g \\ r = r + r_g \\ p = p + p_g \end{cases} \text{for lateral gust terms} \quad (7)$$

Assume that $\eta_{long} = (u_g\ w_g\ q_g)$ and $\eta_{lat} = (v_g\ r_g\ p_g)$. Applying (6) and (7) into equations (4) and (5) results in Lateral Equation of Motion:

$$\dot{X}^{lat} = A_k^{lat} X^{lat} + B_k^{lat} U^{lat} + G^{lat} V_g^{lat}$$

$$Y^{lat} = C_k^{lat} X^{lat} + D^{lat} V_g^{lat}$$

$$Z^{lat} = C_k^{lat} X^{lat} \text{ where } k=0,1,\ldots j \quad (8)$$

where $Y^{lat}$ are lateral measurement from lateral position, velocity, and gyro sensors with measurement errors assumed to be $E_{lat} = X_{measured}^{Lat} - X^{Lat}$ and $V_g^{lat} = [\eta_{lat}\ E_{lat}]^T$. $Z^{lat}$ are lateral performance outputs from $(\dot{v}, \dot{p}, \dot{r}, A_y)^T$.

Longitudinal Equation of Motion:

$$\dot{X}^{long} = A_k^{long} X^{long} + B_k^{long} U^{long} + G^{long} V_g^{long}$$

$$Y^{long} = C_k^{long} X^{long} + D^{long} V_g^{long}$$

$$Z^{long} = C_k^{long} X^{long} \text{ where } k=0,1,\ldots j \quad (9)$$

where $Y^{long}$ are longitudinal measurement from longitudinal position, velocity, and gyro sensors with measurement errors assumed to be $E_{long} = X_{measured}^{Long} - X^{Long}$ and $V_g^{long} = [\eta_{long}\ E_{long}]^T$. $Z^{long}$ are longitudinal performance outputs from $(\dot{u}, \dot{w}, \dot{q}, A_x, N_z)^T$. The above equations (8) and (9) are with the forms of $H_\infty$ robust performance requirement. Therefore, $H_\infty$ robust techniques can be applied to resolve the gust attenuation to the system.

From equations (8) and (9), the difference between each model for $k=0, 1, \ldots j$ can be computed when aerodynamic parameters based on various airspeed sand densities are determined. After combining all differences, the bounds of these differences can be determined. Therefore, the whole group of linear systems on equation (8) and (9) can be rewritten as Lateral Equation of Motion:

$$\dot{X}^{lat} = (A^{lat} + \Delta A) X^{lat} + (B^{lat} + \Delta B^{lat}) U^{lat} + G^{lat} V_g^{lat}$$

$$Y^{lat} = C_1^{lat} X^{lat} + V_g^{lat}$$

$$Z^{lat} = (C_2^{lat} + \Delta C_2^{lat}) X^{lat} \quad (10)$$

Longitudinal Equation of Motion:

$$\dot{X}^{long} = (A^{long} + \Delta A^{long}) X^{long} + (B^{long} + \Delta B^{long}) U^{long} + G^{long} V_g^{long}$$

$$Y^{long} = C_1^{long} X^{long} + V_g^{long}$$

$$Z^{long} = (C_2^{long} + \Delta C_2^{long}) X^{long} \quad (11)$$

Instead of using the given norm-bound assumptions, it has been pre-investigated from all models from equations (8) and (9) and found that these parameter uncertainties on state matrices satisfy the following assumptions $$\begin{cases} \|\Delta A_{j \to j+1}^{Lat}\| \leq \xi^{Lat^T} Q \xi^{Lat} \leq \overline{Q}^{Lat} \\ \|\Delta A_{j \to j+1}^{Long}\| \leq \xi^{Long^T} Q \xi^{Long} \leq \overline{Q}^{Long} \end{cases} \quad (12)$$

where ($\overline{Q}^{Lat}\ \overline{Q}^{Long}$) are symmetric positive semi-definite matrices, which can be adjusted as long as uncertainties satisfy the above constraint (12). Note that $\xi^{Lat}$ and $\xi^{Long}$ are unknown time varying matrices satisfying $$\xi^{Lat^T} \xi^{Lat} \leq I \text{ and } \xi^{Long^T} \xi^{Long} \leq I \text{ for any } \forall t \in [0, \infty) \quad (13)$$

In the system of the invention, it is assumed that ($\overline{Q}^{Lat}\ \overline{Q}^{Long}$) are diagonal matrices with different values on diagonal terms. A search algorithm is designed to find the suitable diagonal values of ($\overline{Q}^{Lat}\ \overline{Q}^{Long}$) so that the above constraints with respect to proper ($\gamma_{lat}, \gamma_{long}$) values on $H_\infty$ robust constraints are satisfied for any parameters changes on equations (10) and (11).

The objective of $H_\infty$ robust control is to design state feedback controllers $$\begin{cases} U^{lat} = U^{lat}(X^{lat}) \text{ and } V^{lat} = V^{lat}(X^{lat}) \\ U^{long} = U^{long}(X^{long}) \text{ and } V^{long} = V^{long}(X^{long}) \end{cases} \quad (14)$$

such that the following norms of transfer functions of longitudinal and lateral constraints are satisfied:

$$\|G^{lat}(s) + \Delta G^{lat}(s)\| \leq \gamma_{lat}^2 \quad (15)$$

$$\|G^{long}(s) + \Delta G^{long}(s)\| \leq \gamma_{long}^2 \quad (16)$$

Note that $G^{lat}$ and $G^{long}$ are lateral and longitudinal transfer function matrices as follows $$G^{lat} = \begin{bmatrix} (A^{lat} + A^{lat}) & (B^{lat} + \Delta B^{lat}) & G^{lat} \\ C_1^{lat} & 0 & I \\ (C_2^{lat} + \Delta C_2^{lat}) & I & 0 \end{bmatrix} \quad (17)$$

and $$G^{long} = \begin{bmatrix} (A^{long} + \Delta A^{long}) & (B_k^{long} + \Delta B^{long}) & G^{long} \\ C_1^{long} & 0 & I \\ (C_2^{long} + \Delta C_2^{long}) & I & 0 \end{bmatrix} \quad (18)$$

Note that $(\gamma_{lat}, \gamma_{long})$ are small given values, which satisfied constraints (15) and (16). The values $(\gamma_{lat}, \gamma_{long})$ are to be determined by the search algorithm, which is described below.

Therefore, to design the required $H_\infty$ robust feedback control laws, the $H_\infty$ Riccati solutions from the constraints without uncertainties are necessary to be solved first with the good prescribed value selection for $(\gamma_{lat}, \gamma_{long})$. Therefore, Riccati solutions, $(P_\infty^{lat} P_\infty^{long}) \in \text{dom}(H_\infty)$, for longitudinal and lateral motions without any uncertainty consideration are associated with the following Hamiltonian matrices, $$H_\infty^{lat} = \begin{bmatrix} A^{lat} & \gamma^{-2} G^{lat} G^{lat^T} - B^{lat} B^{lat^T} \\ -Q^{lat} & -A^{lat^T} \end{bmatrix} \quad (19)$$

$$H_\infty^{long} = \begin{bmatrix} A^{long} & \gamma^{-2} G^{long} G_k^{long^T} - B^{long} B^{long^T} \\ -Q^{long} & -A^{long^T} \end{bmatrix} \quad (20)$$

Note that $Q^{lat} = C_2^{lat^T} C_2^{lat}$ and $Q^{long} = C_2^{long^T} C_2^{long}$, which are symmetric positive semi-definite. The two Riccati inequalities corresponding to the proceeding two Hamiltonian matrices are described as follows:

$$P_\infty^{lat} A^{lat} + A^{lat^T} P_\infty^{lat} + Q^{lat} + P_\infty^{lat} [\Xi^{lat}] P_\infty^{lat} \geq 0$$

where $\Xi^{lat} = \gamma^{-2} G^{lat} G^{lat^T} - B^{lat} B^{lat^T}$ (21)

$$P_\infty^{long} A^{long} + A^{long^T} P_\infty^{long} + Q^{long} + P_\infty^{long} [\Xi^{long}] P_\infty^{long} \geq 0$$

where $\Xi^{long} = \gamma^{-2} G^{long} G^{long^T} - B^{long} B^{long^T}$ (22)

Note that $(\Xi^{lat} \Xi^{long})$ are symmetric positive definite for prescribed values $(\gamma_{lat}, \gamma_{long})$. The system satisfies stabilizable and detectable requirements. The solutions of the above Riccati inequalities will be used as initial condition to find the desired solutions for any uncertainties matrices in transfer functions (15) and (16).

With uncertainties, the objectives are to find lateral and longitudinal control inputs, $U^{lat}$ and $U^{long}$ as follows $$U^{lat} = -K^{lat} X^{lat} \quad (23)$$

$$U^{long} = -K^{long} X^{long} \quad (24)$$

to satisfy lateral and longitudinal uncertain $H_\infty$ constraints (17) and (18), such that the following Hamiltonian performance indexes are satisfied:

$$\overline{H}_\infty^{lat} = \begin{bmatrix} A^{lat} & \gamma^{-2} G^{lat} G^{lat^T} - B^{lat} B^{lat^T} \\ -(Q^{lat} + \overline{Q}^{lat}) & -A^{lat^T} \end{bmatrix} \quad (25)$$

$$\overline{H}_\infty^{long} = \begin{bmatrix} A^{long} & \gamma^{-2} G^{long} G^{long^T} - B^{long} B^{long^T} \\ -(Q^{long} + \overline{Q}^{long}) & -A^{long^T} \end{bmatrix} \quad (26)$$

The above two Hamiltonian matrices have solutions $(\overline{P}_\infty^{lat} \overline{P}_\infty^{long}) \in \text{dom}(H_\infty)$, from the following Riccati inequalities:

$$\overline{P}_\infty^{lat} A^{lat} + A^{lat^T} \overline{P}_\infty^{lat} + (Q^{lat} + \overline{Q}^{lat}) + \overline{P}_\infty^{lat} [\Xi^{lat}] \overline{P}_\infty^{lat} \geq 0 \quad (27)$$

$$\overline{P}_\infty^{long} A^{long} + A^{long^T} \overline{P}_\infty^{long} + (Q^{long} + \overline{Q}^{long}) + \overline{P}_\infty^{long} [\Xi^{long}] \overline{P}_\infty^{long} \geq 0 \quad (28)$$

where state weighting matrices $(Q^{lat} + \overline{Q}^{lat})$ and $(Q^{long} + \overline{Q}^{long})$ are symmetric positive semi-definite.

It is very important to select good prescribed values $(\gamma_{lat}, \gamma_{long})$ as well as $\overline{Q}^{lat}$ and $\overline{Q}^{long}$ so that good stability and time responses for all control gains and uncertainty constraints shown in (17) and (18) can be satisfied simultaneously. In order to achieve this goal together, a search algorithm is illustrated in FIG. 3.

The variables used on the search algorithm are denoted as
1) $(\zeta^{lat} \zeta^{long})$: Individual damping ration of closed loop systems
2) $(q^{lat} q^{long})$: Diagonal search increment variables for $(\overline{Q}^{Lat} \overline{Q}^{Long})$.

Figure 3:
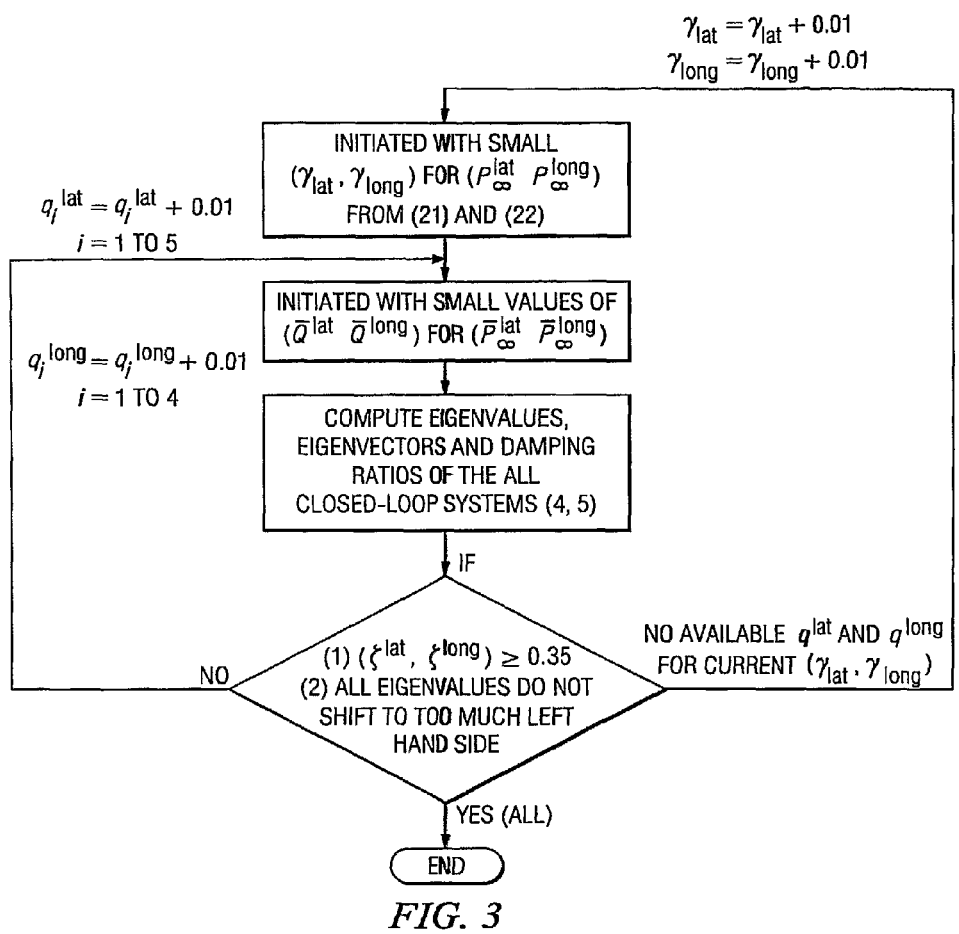
FIG. 3 is a flow chart of a search algorithm used in the system of FIG. 2.

With the search algorithm of FIG. 3, the $H_\infty$ control gain generated from these steps will make the uncertainty in systems (4) and (5) be stable. Therefore, the $H_\infty$ state feedback control gains can be determined as $$K^{lat} = -[B^{lat} B^{lat^T}] \overline{P}_\infty^{lat} \quad (29)$$

$$K^{long} = -[B^{long} B^{long^T}] \overline{P}_\infty^{long} \quad (30)$$

for $k = 0, 1, \ldots, j$, where $(\overline{P}_\infty^{lat}$ and $\overline{P}_\infty^{long})$ are symmetric positive definite for appropriate $(\gamma_{lat}, \gamma_{long})$ and $\overline{Q}^{lat}$ and $\overline{Q}^{long}$, which satisfy the Riccati inequalities of (21, 22) and (27, 28).

Weather Intelligence for the UAV Recovery System

To develop the intelligent portion of system 27, it is assumed that the aircraft, such as a UAV, has all necessary sensors and system dynamics states available such as, for example, airspeed, weather radar, wind speed, climb rate error, sync flight path, transmitting health, and receiving health. The microburst verification is an automatic detecting function inside the aircraft, and this function is accomplished with the following logic set. It should be noted that this set can be combined with flight control effort.

Logic 1: Lose Station Signal when Storm Detected

When an aircraft is in the microburst condition, it is very possible that the aircraft loses wireless communication capabilities with satellites or ground stations. The logic of communication between the UAV and a ground station is considered in the intelligent software logic development. When the UAV meets microburst or severe storm impact, system 27 sends a warning signal to the ground station. If the receiving and transmitting communication is healthy, system 27 will wait for a command from the ground station. If no command is received, system 27 will maintain the current flight mission. However, if the receiving and transmitting communication link has failed, system 27 will wait for a specified period before triggering the robust control design.

Logic 2: Control Surface Overreaction to Storm Input

A control surface overreaction system is designed by setting positive and negative limit hit logic. During the normal steady-state flight, the control surfaces are approximately close to the middle positions in their range of motion. In order to maintain the programmed flight path while in a microburst, the control law design employed when encountering gusts will command the control surface to move to either side. When the gust continues, the control surface may hit its movement limit. Once this happens, the limit hit recovery logic will immediately be activated, giving up maintaining the flight path in order to keep the aircraft safe. The longitudinal controller input and vertical controller input will ignore ground station inputs and adjust the altitude of the aircraft for keeping the airspeed within a specified range.

Logic 3: Dangerous Factor Over the Desired Setting Value

Dangerous factor is designed with respect to an Escape Mode. When Escape Mode is triggered, whether the communication system is healthy or not, the robust recover system will automatically be triggered. This dangerous factor value is pre-evaluated based on national weather laboratory requirements. Currently, this value is temporarily set to be 45 ft/sec. However, this dangerous factor is also dependent on the maximum gust value in vertical axis. This value will be determined from flight tests of the system.

Logic 4: Combination of All Other Situations

Combination of weather condition, control effort, dangerous factor and Escape Mode will cause system 27 to select one of state flow intelligent portions. This state flow logic can be extended to any flight condition if necessary. All control inputs and sensor information are included in the intelligent logic.

Robust Flight Control Recovery from Microburst

Figure 4A:
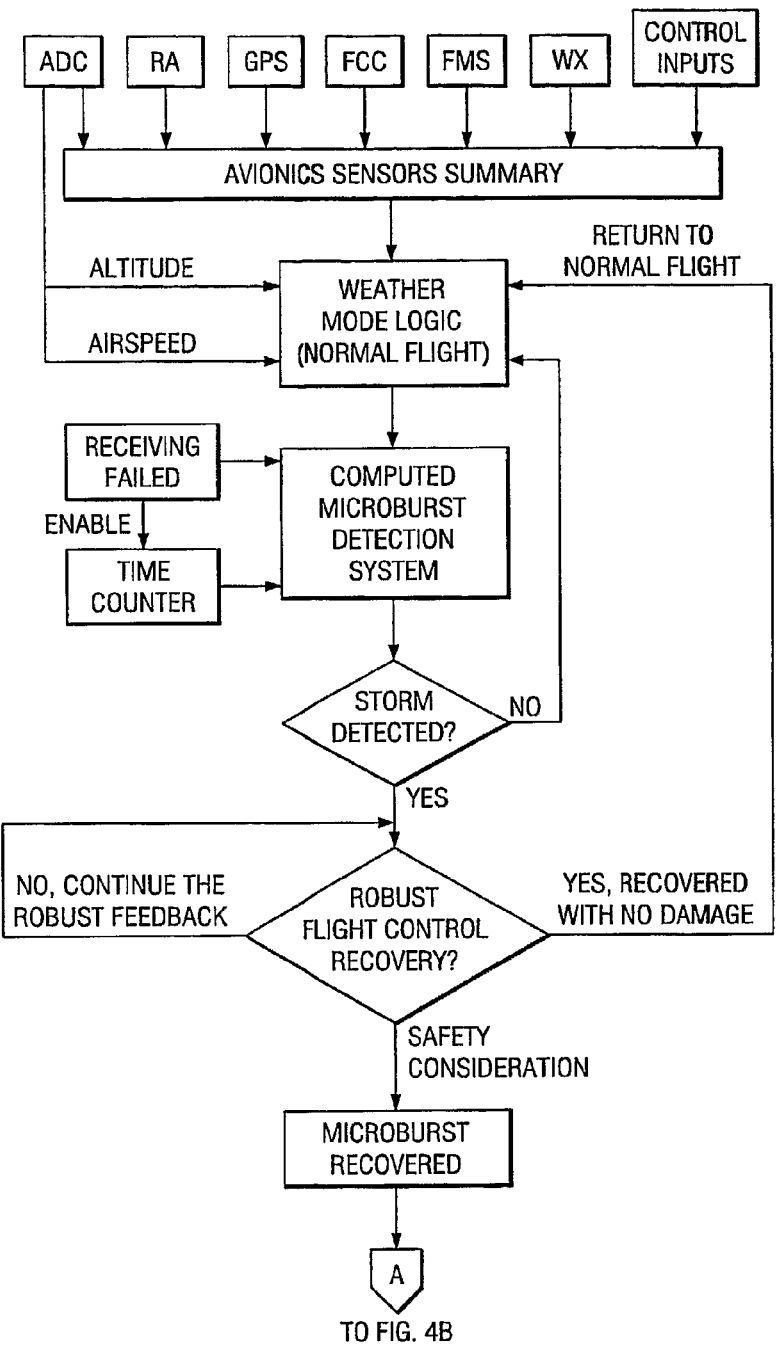
FIGS. 4A and 4B are a flow chart showing the overall logic in the system of FIG. 2.
Figure 4B:
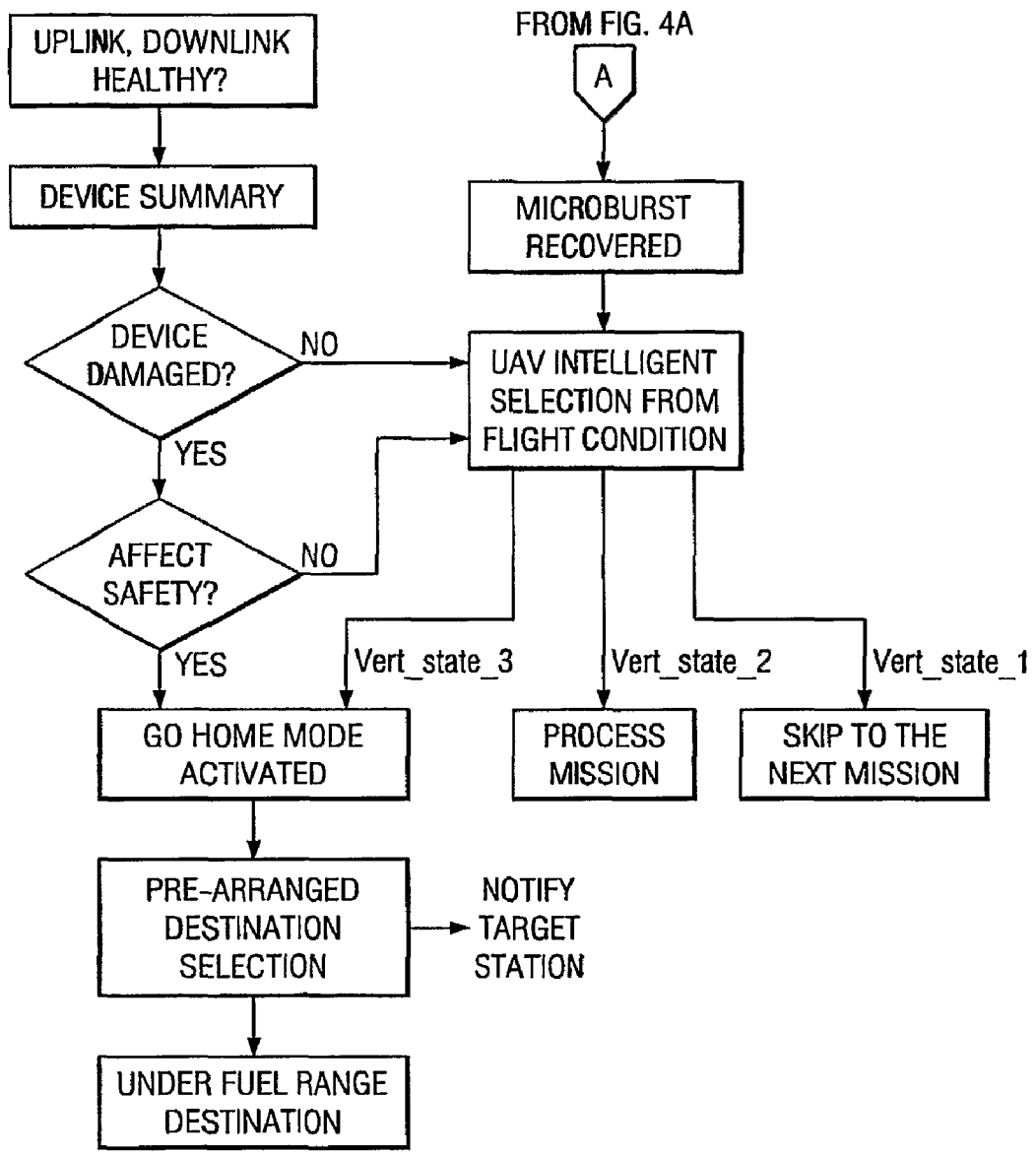

FIGS. 4A and 4B are flow charts that illustrate how the overall logic works in the microburst encountering and recovery system. For example, when system 27 detects a microburst, the following summary logics will be automatic:

1) When a storm is detected, system 27 will command the UAV to align its heading to the windshear direction (headwind) within 90 seconds based on sensor information.

With this arrangement, the UAV will reduce its lateral and directional control surface inputs to a minimum, allowing for sufficient available control surface input to overcome a microburst condition.

2) When a storm is detected, system 27 will command the UAV to reduce or increase its airspeed to maintain the airspeed within a specified safety range.

The safety airspeed is pre-determined based on the minimum required for control surface usage. For example, this minimum airspeed may be about 50-100 kts. However, the values may be different for different types of aircraft.

3) When a storm is detected, system 27 will trigger an automatic altitude recovery function.

The automatic altitude recovery function is dependent on information from (a) an ADC static probes for altitude, (b) a radar altimeter (if installed), (c) a GPS altitude (if still working), (d) transmitted ground station information (if still working), or (e) other sensor information. Usually, microbursts occur at a low altitude, and once the "storm detected" function is triggered, it is necessary for the UAV to fly out of the microburst as soon as possible with the safety airspeed and altitude, total control surface response, and some sensor information.

4) When a storm is detected, system 27 will have an automatic maneuver recovery function.

When a storm is detected, the UAV may be in low altitude landing approach mode, low altitude searching mode, or other flight mode. During the storm conditions, system 27 will switch to the safety mode first, and then recover the prior flight mode when storm mode is no longer valid selected 5) When a storm is detected, system 27 selects ground station intercept mode.

When a storm is detected, system 27 will send out "storm detected" information to a ground station. The ground station can intercept the UAV for any command to bring back the UAV if the satellite signal is still working. However, the UAV will have its own logic to determine the best survival condition from the robust flight control laws.

6) After the storm, the UAV could be damaged and lose all transmitting and receiving capacities.

Under this condition, a "go home" mode will be triggered in which system 27 commands the UAV to fly to a pre-programmed position. The UAV will continue sending its failure signals to the ground station. After escaping from storm, the UAV will stay out of storm for a specified time and then continue to the next mission. System 27 will have an intelligent logic to select its own flight path if ground station signal is not available, the ground station command is not changed, or if the ground station command is not safe.

7) Flight path selection will automatically be triggered if the ground station signal is not available.

The UAV flight path selection will be based on its storm recovery condition. It can intelligently select to continue its own mission, by-pass to next mission, or select "go home" mode. All these are based on sensor information, equipment health, and flight safety.

Microburst Condition Estimation through Reversed Parameter ID Method

Figure 5:
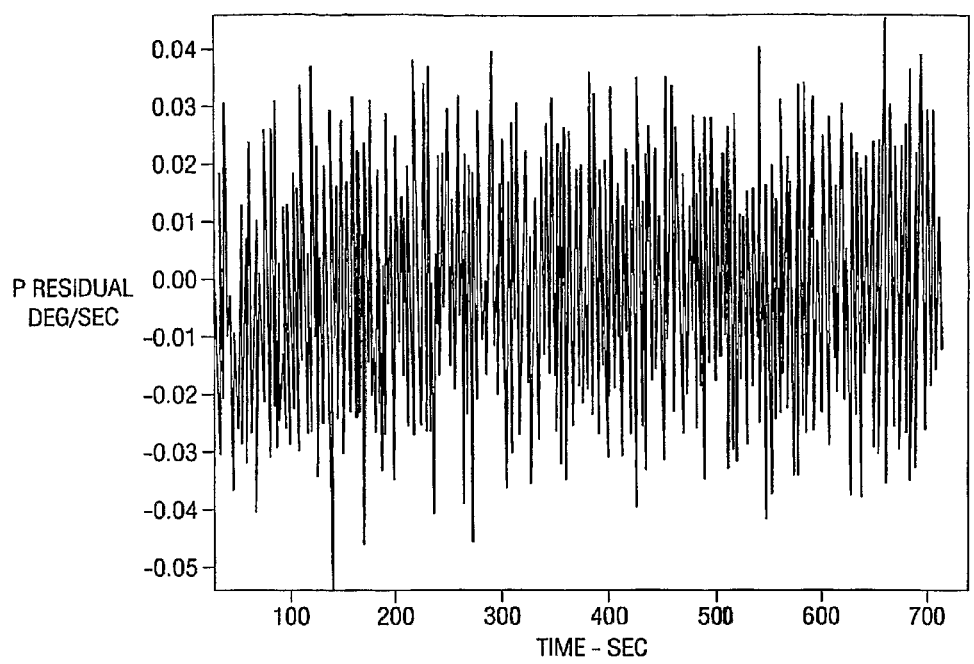
FIGS. 5 through 7 are graphs of roll-rate, pitch-rate, and yaw-rate residuals for a simulation using the system according to the present invention.
Figure 6:
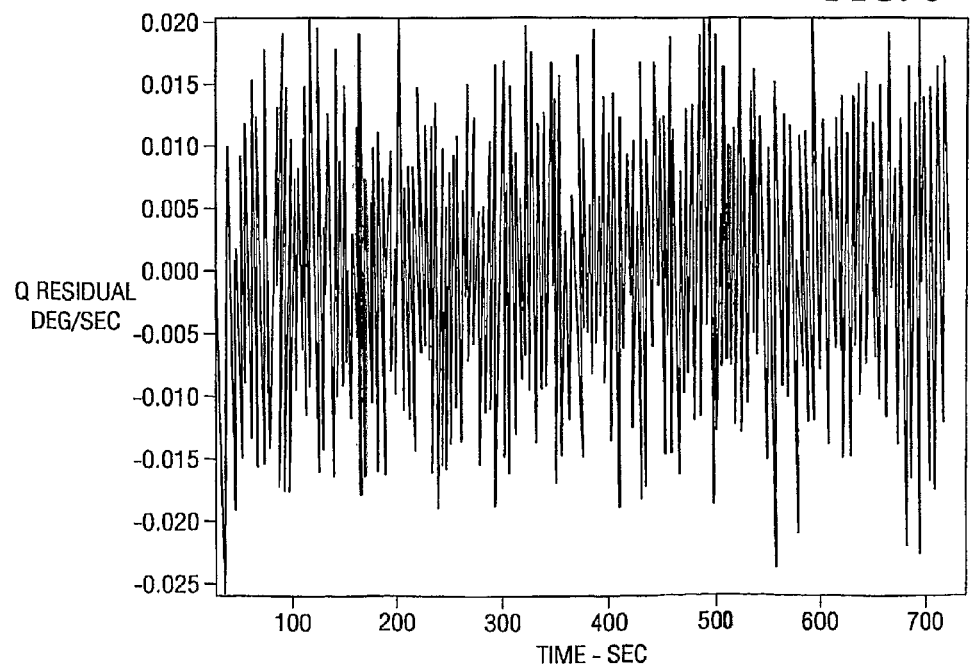
Figure 7:
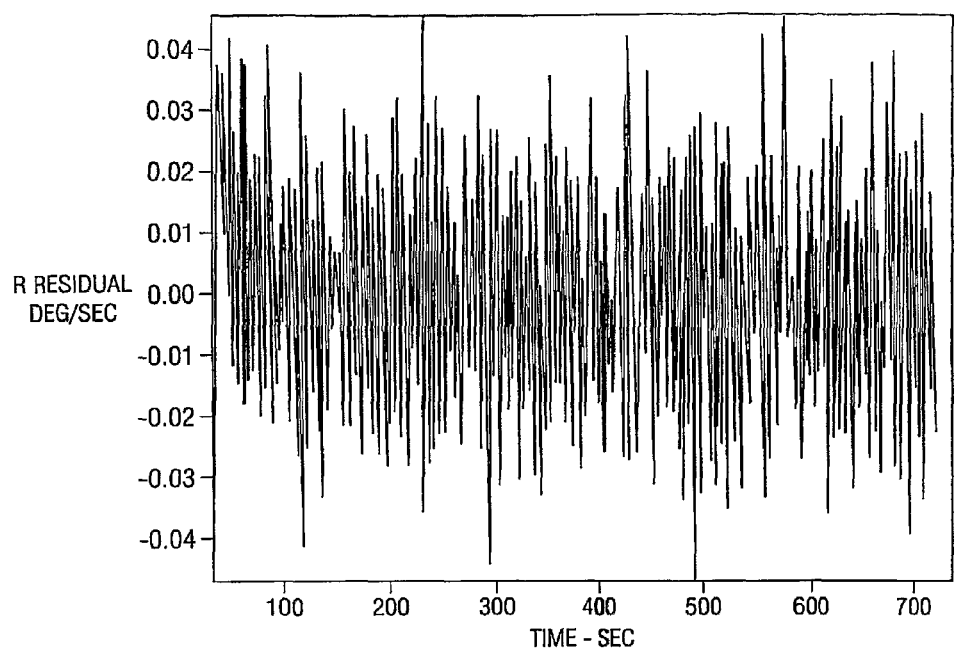

Simulation of microburst condition with respect to reserved parameter identification method is shown in FIGS. 5, 6, 7, 8, 9, and 10. During steady-state flight with calm air conditions, the residuals from roll rate, pitch rate, and yaw rate will be very low. A simulation of storm-scale disturbances was conducted, and the residuals are shown in FIGS. 5, 6, and 7, for roll rate, pitch rate, and yaw rate (P, Q, R), respectively.

Figure 8:
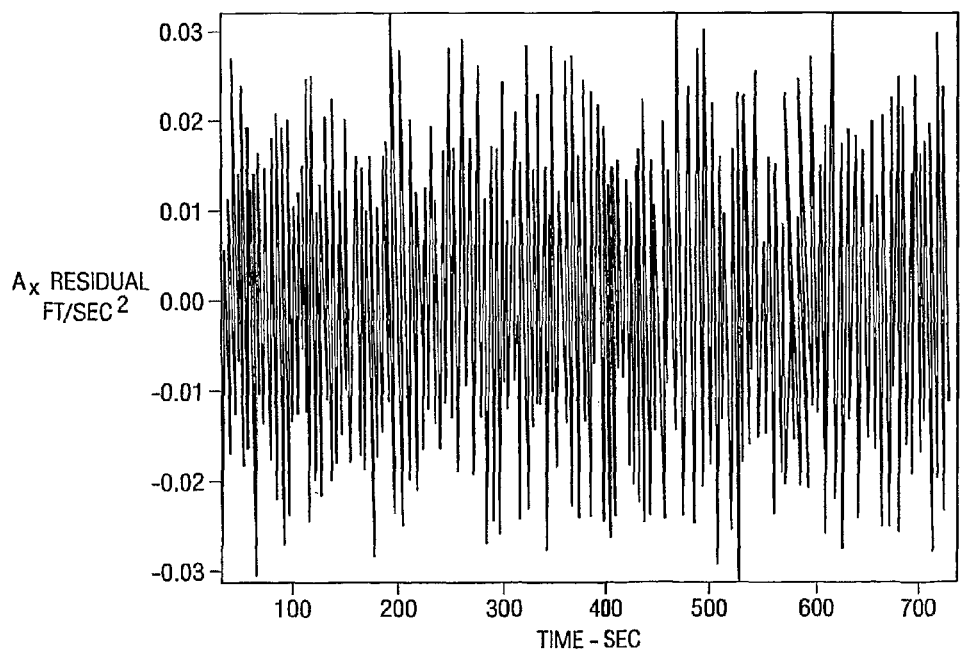
FIGS. 8 through 10 are graphs of x-acceleration, y-acceleration, and z-acceleration residuals for a simulation using the system according to the present invention.
Figure 9:
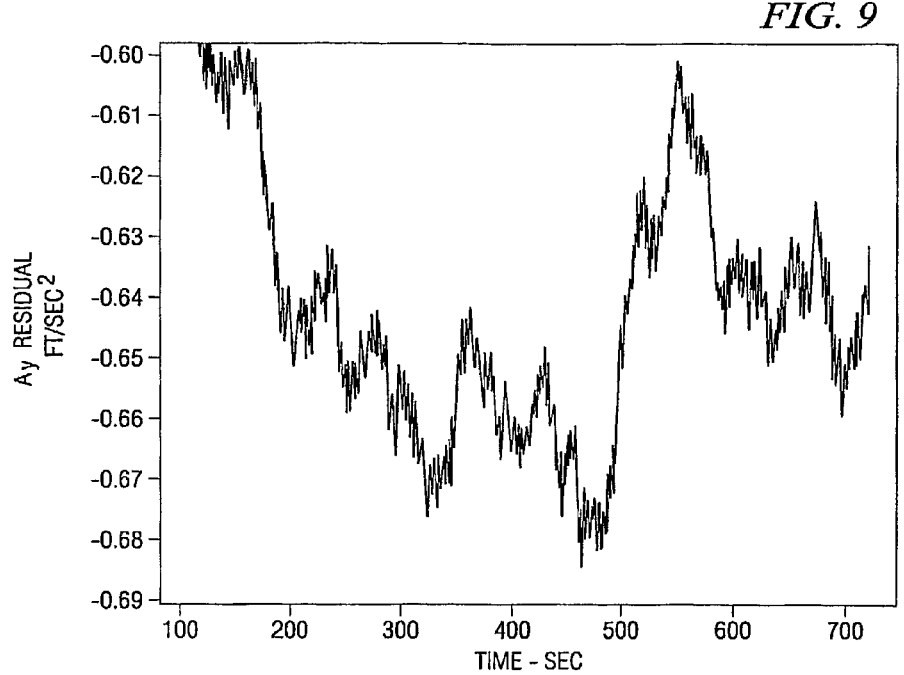
Figure 10:
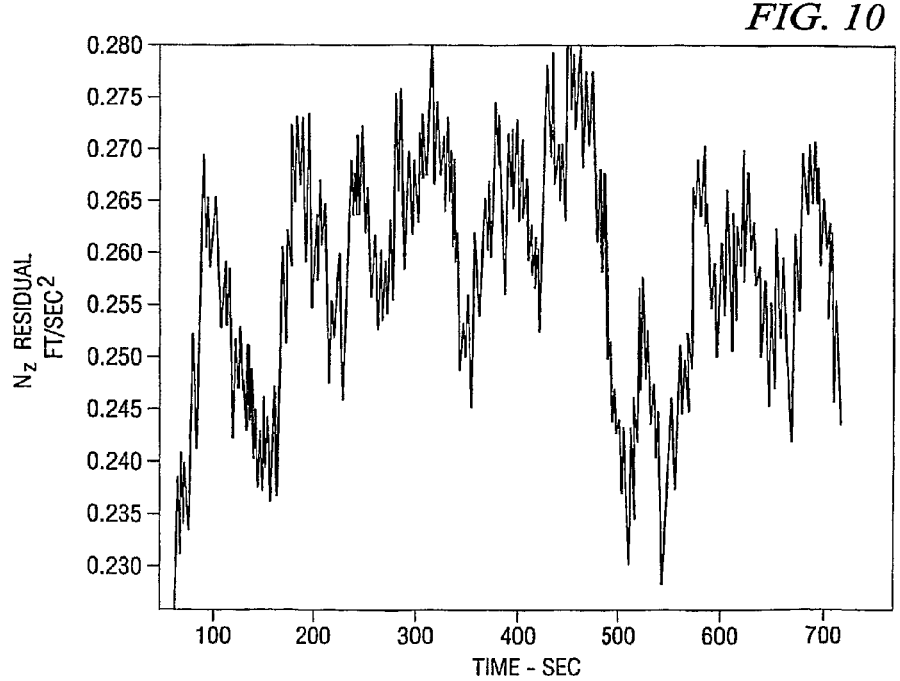

Similarly, the residuals from x, y and z accelerations, ($A_x$, $A_y$, $N_z$), are shown in FIGS. 8, 9, and 10. Note that z acceleration is normalized. Usually, with any disturbance, these values are very close to zero. However, when disturbances are not small, these values will be affected. The values of $A_y$ and $A_z$ will be affected much more than that of $A_x$. Although these values are not very high, their reaction to other aircraft maneuvers will be significant.

Figure 11:
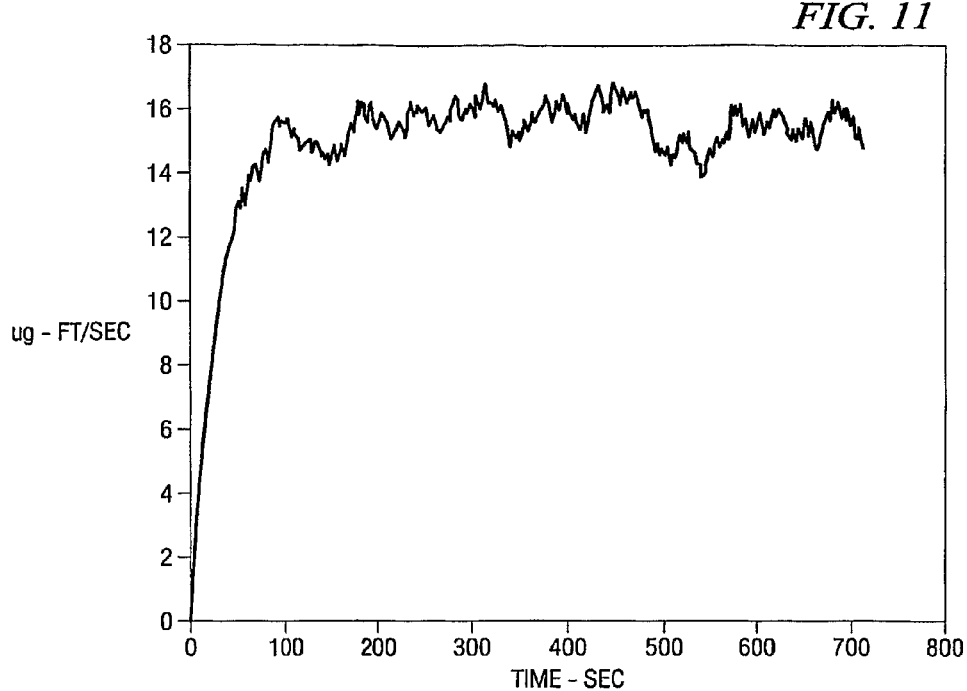
FIGS. 11 through 13 are graphs of wind gust estimation by the system of the invention using the residuals of FIGS. 5 through 10.
Figure 12:
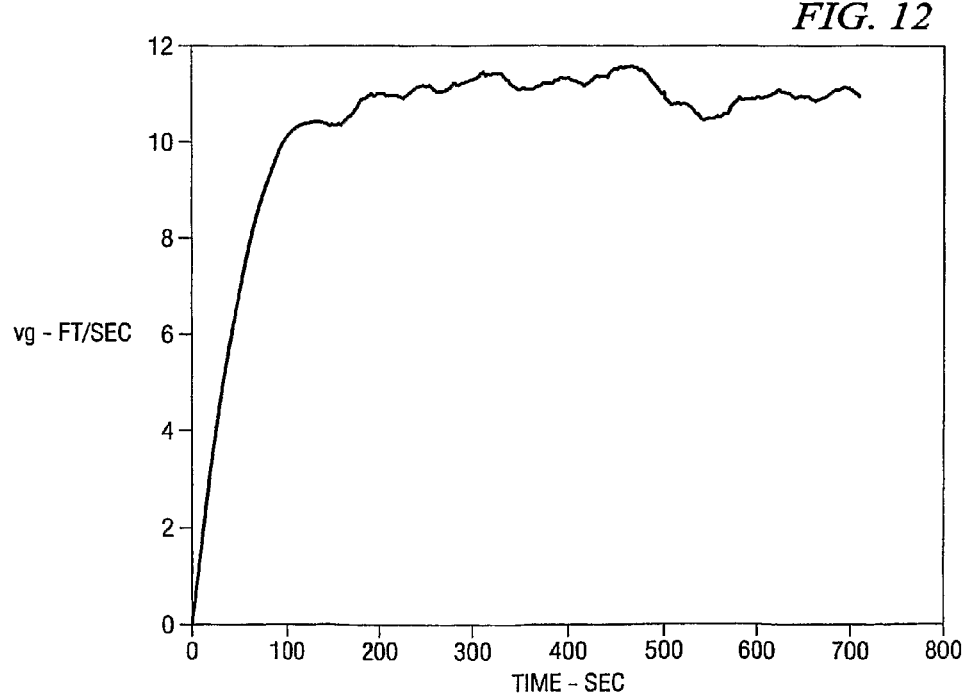
Figure 13:
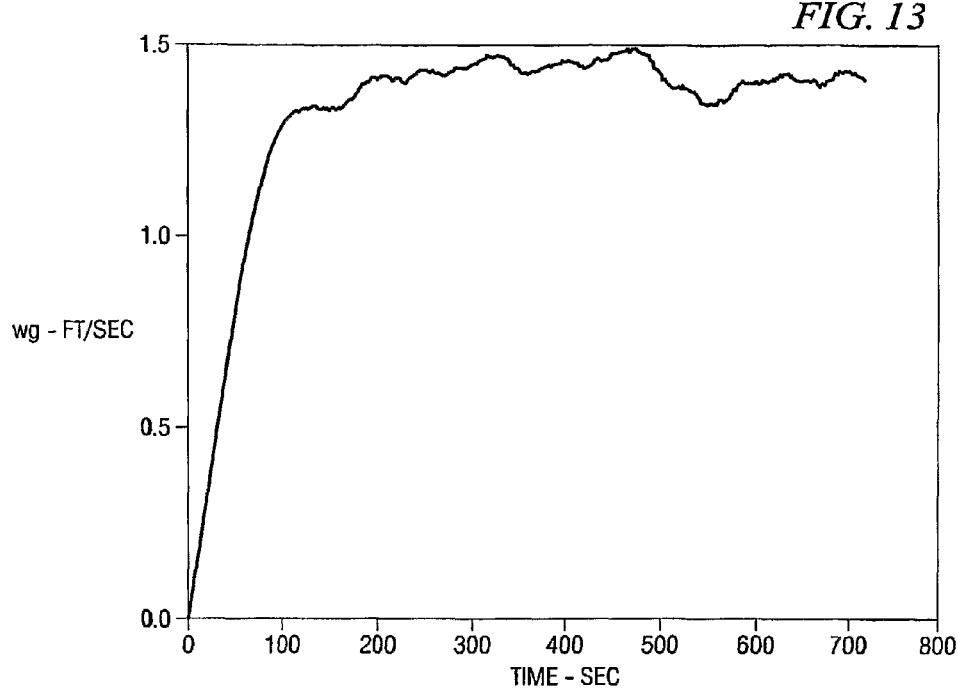

Wind gust estimation per the above residuals is shown in FIGS. 11, 12, and 13. Please note that the gust inputs are slow increment into the aircraft system from zero. With estimated gust, the storm level detected based on the above residual is in Level (4), Severe Storm. It is considered as windshear condition 1 shown in FIG. 1. Therefore, the aircraft microburst detection system will send out the caution signal to ground station for severe storm attack.

Microburst Flight Simulation Results

A windshear profile was reconstructed based on the crash on 24 Jun. 1975 of a Boeing 727 at JFK airport in New York. This windshear profile is simulated based on helicopter performance residuals from the reversed parameter ID method. Robust control law is applied during low-level flight to verify the UAV response from microburst attack. Simulation results are shown in FIGS. 14-27.

Figure 14:
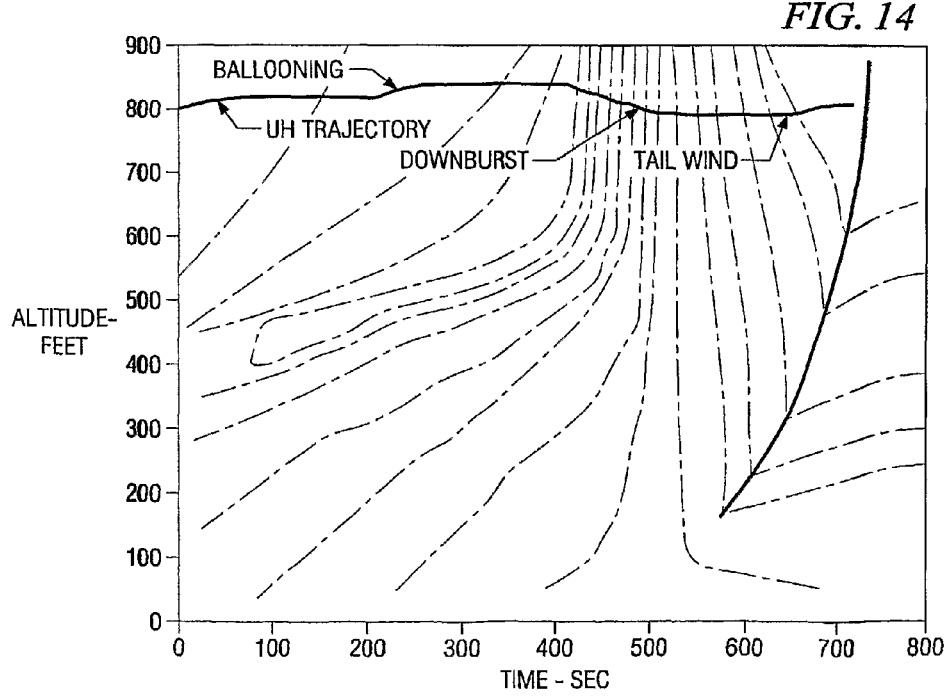
FIGS. 14 through 27 are graphs of measured and calculated values for a simulation using the system according to the present invention.

UAV altitude trajectory responses on all three conditions are shown in FIG. 14. JFK wind shear related to aircraft trajectory is added to show all three conditions. It is shown that when the UAV is ballooning in condition 1, the robust controller will allow the aircraft to be ballooned a small amount while keeping altitude around the desired value, which is 800 feet. When the UAV meets the downburst condition, the UAV will not be pushed downward very much immediately. Instead, the system 27 recognizes the downburst condition is reached, and its immediate pitching response, shown in FIG. 18, recovers the altitude performance. While the aircraft is continuing subject to headwind attack followed by downburst, this motion looks like it is to be expected by the UAV. The aircraft does lose some of its altitude, but the UAV still maintains its trajectory very well. This figure clearly shows the UAV recovering from the microburst event.

Figure 15:
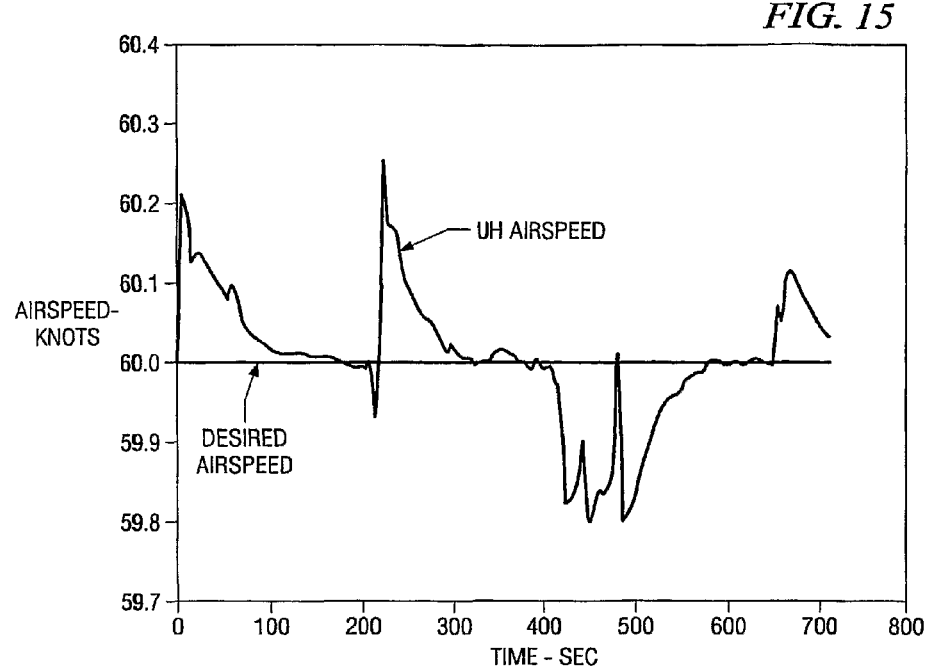

UAV airspeed performance is shown in FIG. 15. It is shown that during the initial headwind condition, the gust velocity made the UAV airspeed increase. However, the system 27 did not overreact to this event. When the UAV went into the downburst condition, the aircraft was suddenly pushed down, but system 27 immediately recognized the event and recovered with higher than desired speed. Furthermore, when the UAV hit condition 3, the aircraft struggled to overcome airspeed loss and recovered from this event. Without good robust control law, most aircraft will lose performance and crash in this type of microburst.

Figure 16:
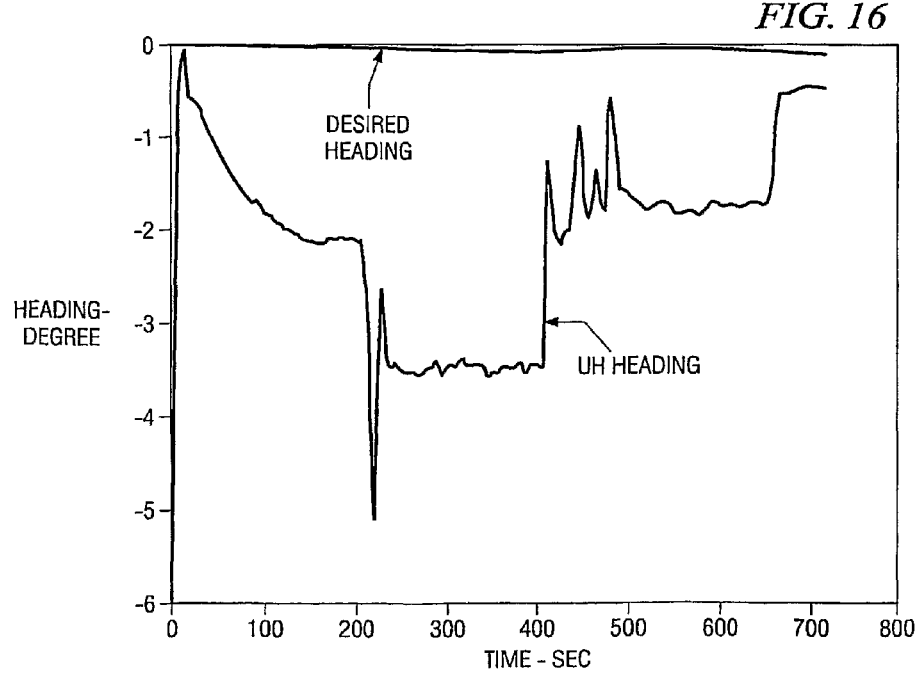
Figure 17:
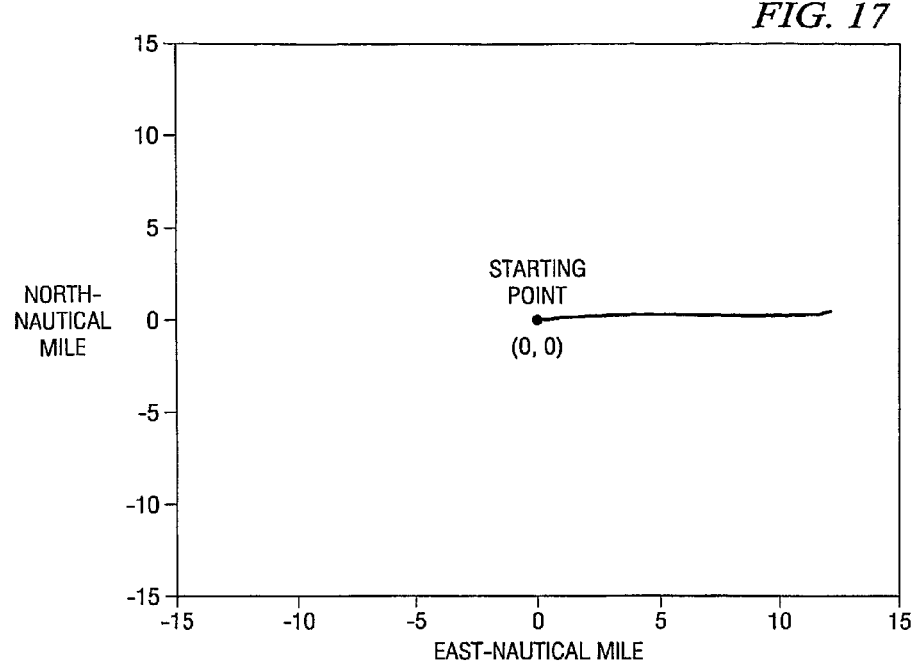

The UAV heading and x-y plot are shown in FIGS. 16 and 17, respectively. It is assumed that lateral gust was applied to the vehicle at all times when the microburst attack happened, but later gust did not change direction until it slowed down. A heading angle response to the side gust is as high as 16 ft/sec, as shown in FIG. 16. It is shown that heading may be perturbed a small amount by the microburst impact. However, system 27 immediately commanded the UAV to correct the heading angle after the event. From FIG. 17, the UAV is assumed to start the microburst impact from origin (0, 0) with its heading angle to zero degree to the East. Until the end of the microburst impact, it is clearly shown in FIG. 23 that UAV overall flight path in x-y directions, was not greatly affected.

Figure 18:
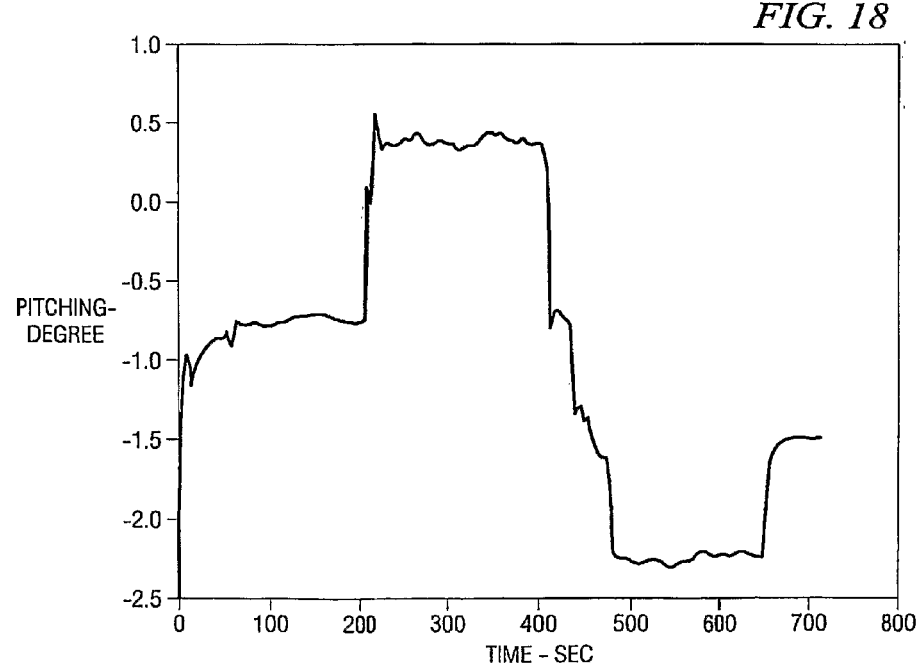

Pitch angle response with respect to the microburst is shown in FIG. 18. It should be noted that the pitch angle at the steady-state level flight is around −1.5 degrees. When the initial gust occurs in the ballooning condition, the pitch angle is increased a small amount off the level flight value when robust control is applied. When the UAV meets the downburst condition, in order to adjust this sudden event on vertical direction, vertical robust control input is acting very quickly to increase the pitch angle even more so that the effect is reduced to minimum. When the UAV enters the third condition, the horizontal wind gust is suddenly switched from negative to positive and the vertical gust is changed to close to zero. In order to overcome this tail wind event, the UAV robust controller guides the pitching angle down until this effect is minimized.

Figure 19:
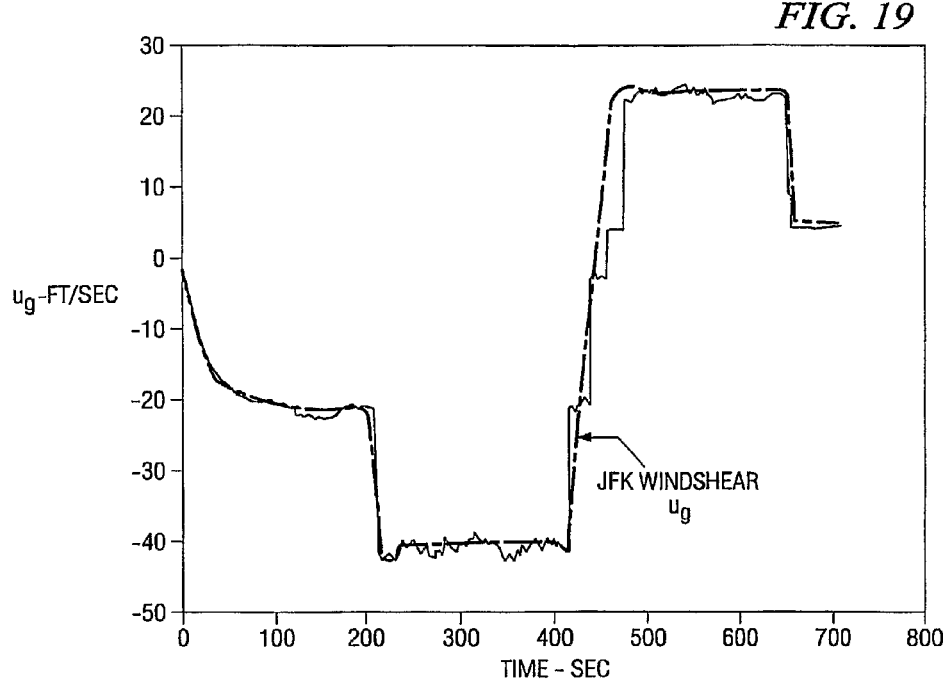
Figure 20:
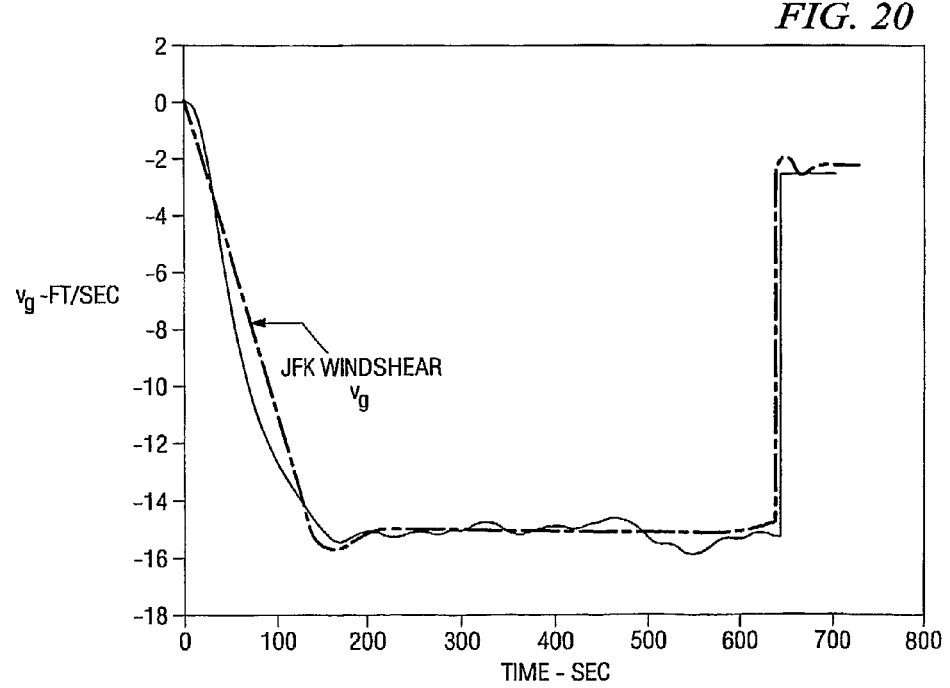
Figure 21:
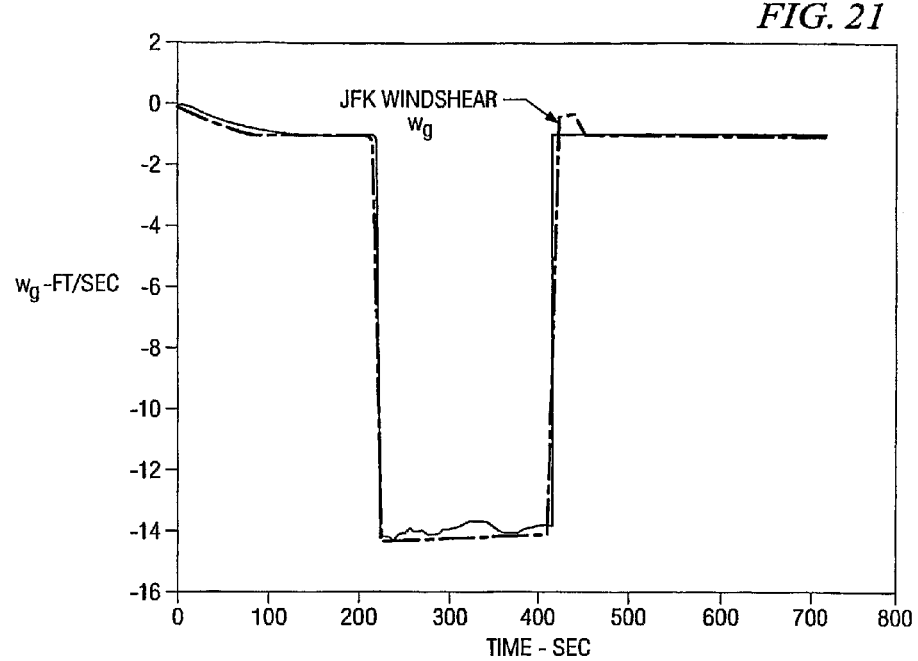
Figure 22:
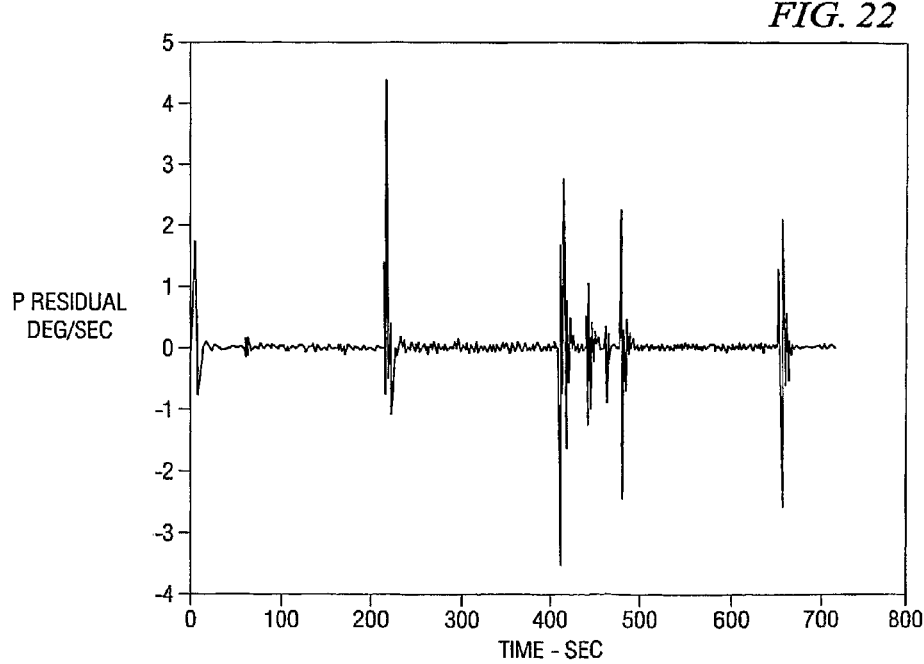
Figure 23:
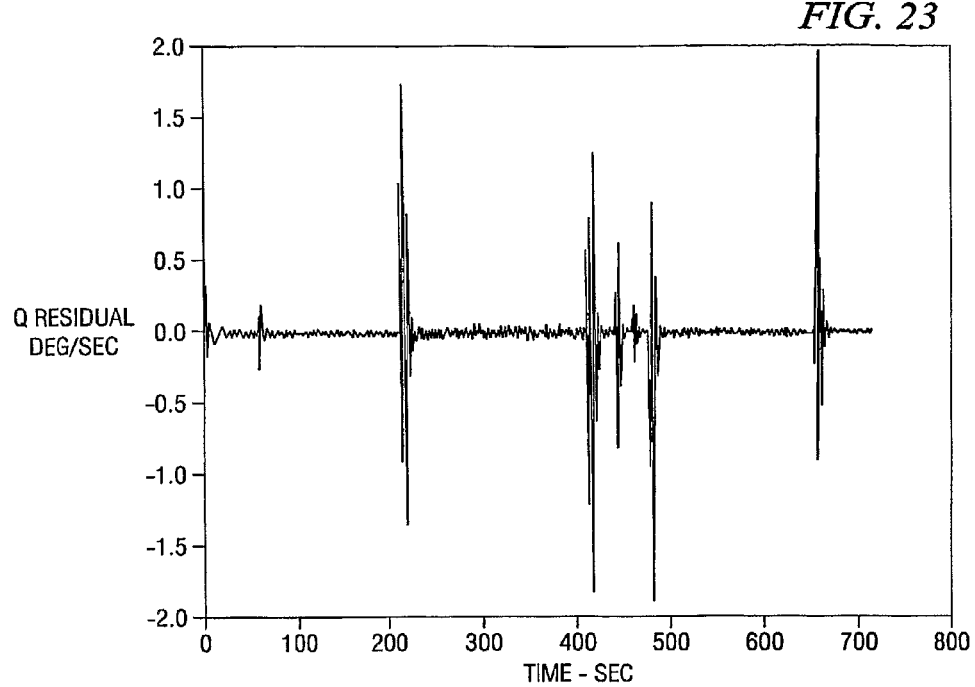
Figure 24:
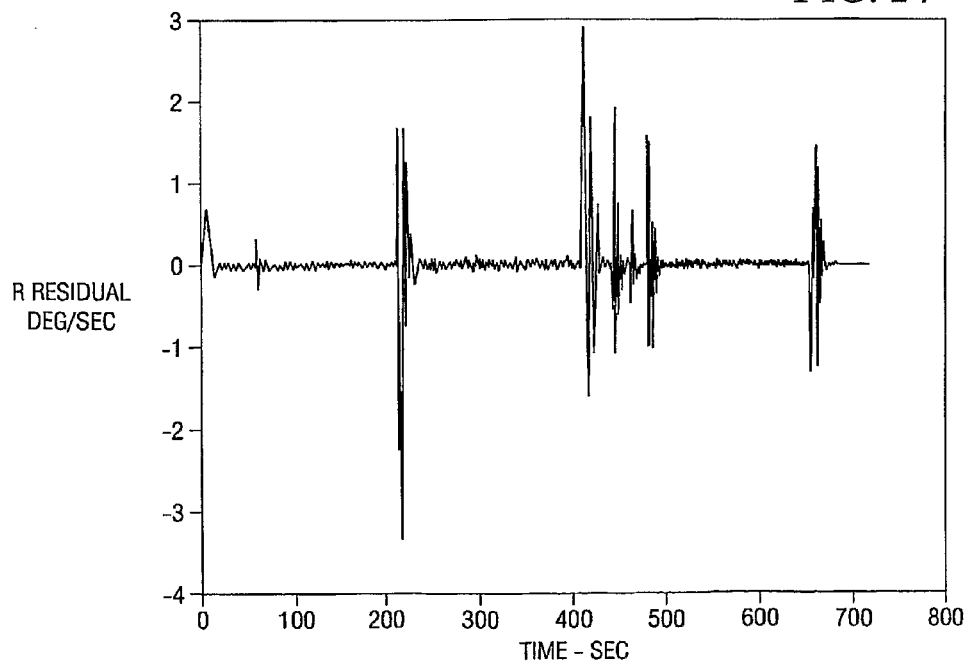

The gust components employed for this simulation are shown in FIGS. 19, 20, and 21. FIG. 19 is the horizontal component, FIG. 20 is the lateral component, and FIG. 21 is the vertical component. Components of JFK wind shear are plotted with dashed lines aside to these figures. The figure shows that the horizontal wind gust is slowly increased when the UAV enters the microburst dominating area. The horizontal gust will act similar to JFK gust with sharp changes in its three directions. Similarly, the side gust velocity and the vertical wind gust are very close to JFK windshear. It should be noted that these gust profiles are generated using the computed microburst estimation method through reversed parameter ID method of the methods of the present invention. With such a gust profile, the Boeing 727 crashed; however, the robust controller of the invention prevented the simulated UAV from crashing.

The residuals used to predict the three direction gust responses are shown in FIGS. 22 to 27. On three angle rate responses, (roll rate, pitch rate, yaw rate), the suddenly changed amplitudes for more than ten seconds indicates the starting point of the microburst conditions. If robust controller is not applied, the oscillation on these angle rates will not be damped, but will keep increasing until they are out of control. This is one of the main reasons causing loss of controlled flight in windshear.

Figure 25:
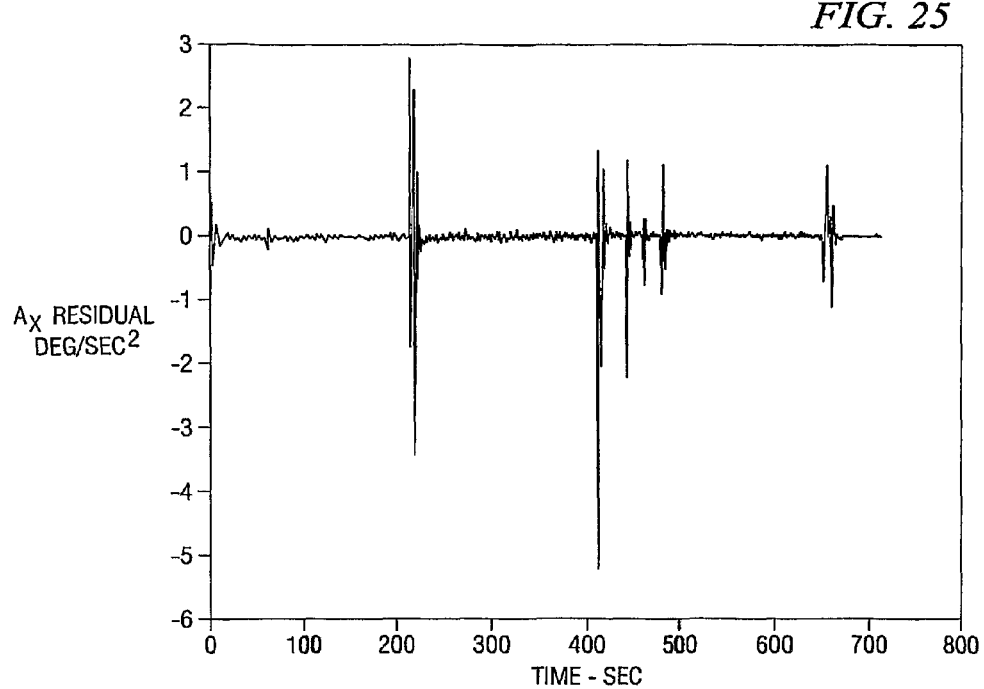
Figure 26:
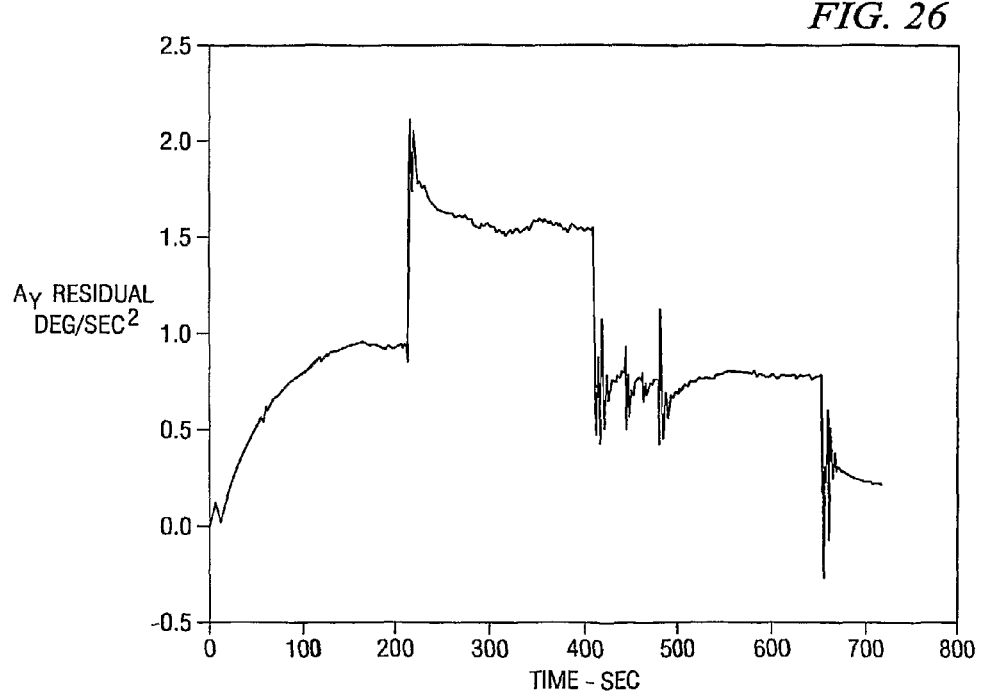
Figure 27:
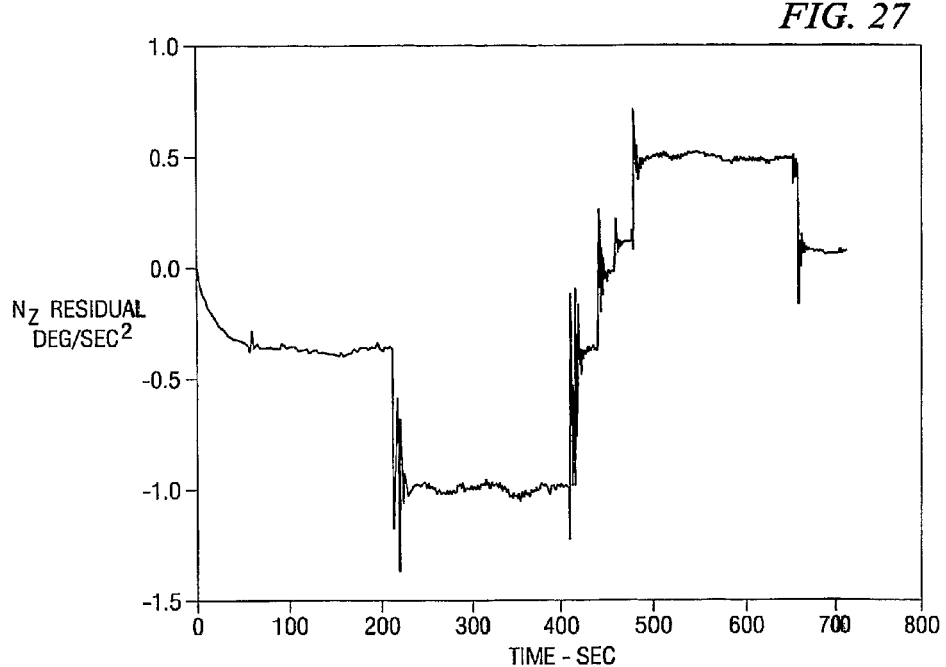

On three acceleration components shown in FIGS. 25, 26 and 27, it is shown that gust loads are not white in lateral and vertical directions. Similar to angle rates, acceleration components will have big changes when the three microburst conditions initially impact the aircraft. Depending on the each impact condition, lateral acceleration residual changes with response to robust control. It is shown that the highest lateral impact happens in downburst condition while aircraft lift decreasing. However, even with this kind of difficult condition, the simulated UAV employing the robust control laws of the invention maintained its performance. One of reasons of overcoming this impact is that the developed control law is based on a worst-case design. The continuous horizontal gust impact to horizontal acceleration can be as high as 3.0 ft/sec$^2$, and the maximum horizontal gust can reach 6.0 ft/sec$^2$. Maximum vertical gust impact to its acceleration is higher than 1.0 ft/sec$^2$.

The disclosed intelligent flight control system includes
1) Robust control law development
2) Uncertainty computations from all models
3) Reversed parameter ID estimation for gust covariance estimation
4) Reversed Dryden power spectral density function for gust estimation
5) Computed automatic gust detecting system
6) Intelligent design of UAV to encounter weather condition
7) Intelligent Escape Mode design when gust power density is too strong
8) Lateral alignment design in storm mode
9) Control surface limit hit escape logic design in storm mode
10) Go Home Mode design when sensor failure after the storm attack
11) Minimum fuel destination selection after the storm attack if sensors failed.

While described above as being used with an unmanned aircraft, the system of the invention is applicable to all types of aircraft, including manned aircraft. The system of the invention may also incorporate additional features, including override methods for returning control to a pilot.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A flight control system for controlling the flight of an unmanned aircraft through windshear conditions, the system comprising:
   means for measuring values of selected flight performance states of the aircraft;
   a control system for operating flight control devices on the aircraft based at least in part on control inputs from a ground station and a preprogrammed flight path associated with a current mission; and
   a windshear detection system located on the aircraft, the windshear detection system using at least some of the measured values of the selected flight performance states to calculate a gust wavelength during flight for comparison to pre-determined values in a table for determining whether windshear conditions exist, the windshear detection system having a subsystem configured with a reverse system parameter identification function and a reverse spectral density function for calculating the gust wavelength;

wherein the reverse system parameter identification function computes a plurality of covariance aircraft parameters through residual computation; and wherein the reverse spectral density function uses the plurality of covariance aircraft parameters to compute the gust wavelength;

wherein the control system is configured to activate a recovery system for operating at least one of the flight control devices in response to an output of the windshear detection system, wherein the control system activates the recovery system based at least in part on communications with the ground station, and wherein the control system is configured to select from a plurality of options if communications with the ground become unavailable, wherein the options include continuing with the current mission and the options include returning to a preprogrammed position.

2. The flight control system according to claim 1, wherein the gust wavelength is calculated using gusts in three orthogonal directions.

3. The flight control system according to claim 1, wherein the windshear detection system uses and a time counter function to calculate the gust velocity.

4. A flight control system for an unmanned aircraft, the system comprising:

means for measuring values of selected flight performance states of the aircraft;

a control system for operating flight control devices on the aircraft; and a windshear detection system, comprising:

input means for receiving the measured values of the flight performance states;

a computer-based system using a reverse system parameter identification method, a reverse spectral density function, and a time counter function for calculating gust velocities of a current windshear condition; and a table with pre-determined gust velocity values for determining whether windshear conditions exist;

wherein the calculated gust velocity values from the computer-based system are compared with pre-determined gust values from the table to determine whether windshear conditions exist;

wherein the reverse system parameter identification function computes a plurality of covariance aircraft parameters through residual computation; and wherein the reverse spectral density function uses the plurality of covariance aircraft parameters to compute the gust wavelength;

wherein the control system is configured to activate a recovery system for operating at least one of the flight control devices in response to an output from the windshear detection system.

5. The flight control system according to claim 1, wherein the control system activates the recovery system based at least in part on a state of communications with the ground station such that the control system activates the recovery system based at least in part on a determination that a predetermined amount of time has passed since control inputs were last received from the ground station.

6. The flight control system according to claim 1, wherein the recovery system is configured to ignore control inputs from the ground station so as to keep the airspeed of the aircraft within a specified range.

7. The flight control system according to claim 4, wherein the control system activates the recovery system based at least in part on a state of communications with the ground station such that the control system activates the recovery system based at least in part on a determination that a predetermined amount of time has passed since control inputs were last received from the ground station.

8. The flight control system according to claim 4, wherein the recovery system is configured to ignore control inputs from the ground station so as to keep the airspeed of the aircraft within a specified range.

9. The flight control system according to claim 4, wherein the control system is operated in part by control inputs from a ground station and a preprogrammed flight path associated with the current mission.

* * * * *